(12) United States Patent
Thoele et al.

(10) Patent No.: US 12,555,418 B2
(45) Date of Patent: Feb. 17, 2026

(54) SYSTEMS AND METHODS OF DETERMINING EFFECTIVENESS OF VEHICLE SAFETY FEATURES

(71) Applicant: STATE FARM MUTUAL AUTOMOBILE INSURANCE COMPANY, Bloomington, IL (US)

(72) Inventors: Jody Ann Thoele, Bloomington, IL (US); Jaime Skaggs, Chenoa, IL (US); Scott Thomas Christensen, Salem, OR (US); Ashish Sawhney, Bloomington, IL (US); Neill Broadstone, Bloomington, IL (US); Angela Glusick, Bloomington, IL (US); Gustufus Phillip Theofanis, Indianapolis, IN (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 695 days.

(21) Appl. No.: 17/711,412

(22) Filed: Apr. 1, 2022

(65) Prior Publication Data

US 2023/0177892 A1  Jun. 8, 2023

Related U.S. Application Data

(60) Provisional application No. 63/285,754, filed on Dec. 3, 2021.

(51) Int. Cl.
  *G07C 5/08* (2006.01)
  *B60W 30/08* (2012.01)
  *G07C 5/00* (2006.01)
(52) U.S. Cl.
  CPC .......... *G07C 5/0808* (2013.01); *B60W 30/08* (2013.01); *G07C 5/008* (2013.01); *B60W 2756/10* (2020.02)

(58) Field of Classification Search
  CPC ..... G07C 5/0808; G07C 5/008; B60W 30/08; B60W 2756/10; G06Q 50/40;
  (Continued)

(56) References Cited

U.S. PATENT DOCUMENTS 9,311,271 B2  4/2016  Wright
9,633,487 B2  4/2017  Wright
(Continued)

FOREIGN PATENT DOCUMENTS

EP  3239686 A1  11/2017
EP  3578433 B1  8/2020
(Continued)

OTHER PUBLICATIONS

Hua et al., A brief review of machine learning and its application, Information Engineering Institute Capital Normal University (2009).
(Continued)

*Primary Examiner* — Peter D Nolan
*Assistant Examiner* — Demetra R Smith-Stewart
(74) *Attorney, Agent, or Firm* — MARSHALL, GERSTEIN & BORUN LLP

(57) ABSTRACT

Systems and methods for determining the effectiveness of vehicle safety features are provided. Vehicle data is obtained for vehicles having various smart safety features, and a list of translated vehicle build records is generated from the obtained data applying OEM-agnostic terminology for the smart safety features. A machine learning algorithm may be trained to generate an effectiveness score associated with one or more smart safety features, at least by analyzing a plurality of translated vehicle build records, vehicle telematics data, and vehicle accident records associated with each of the plurality of vehicles.

20 Claims, 10 Drawing Sheets

(58) Field of Classification Search
CPC .............. G06Q 10/20; G06Q 30/0278; G06Q 30/0282; G06Q 40/08
See application file for complete search history.

(56) References Cited

U.S. PATENT DOCUMENTS

| | | | |
|---|---|---|---|
| 9,830,748 | B2 | 11/2017 | Rosenbaum |
| 9,990,782 | B2 | 6/2018 | Rosenbaum |
| 10,156,848 | B1* | 12/2018 | Konrardy ............ G01C 21/3697 |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 10,949,814 | B1 | 3/2021 | Nelson et al. |
| 11,080,841 | B1 | 8/2021 | Knuffman et al. |
| 11,106,926 | B2 | 8/2021 | Lambert et al. |
| 11,144,889 | B2 | 10/2021 | Li et al. |
| 11,227,452 | B2 | 1/2022 | Rosenbaum |
| 11,367,142 | B1 | 6/2022 | Wang et al. |
| 11,407,410 | B2 | 8/2022 | Rosenbaum |
| 11,524,707 | B2 | 12/2022 | Rosenbaum |
| 11,567,966 | B2* | 1/2023 | Federspiel ............... F24F 11/65 |
| 11,594,083 | B1 | 2/2023 | Rosenbaum |
| 11,661,072 | B1 | 5/2023 | Cardona et al. |
| 2018/0047107 | A1* | 2/2018 | Perl ........................ G06N 5/02 |
| 2019/0087529 | A1* | 3/2019 | Steingrimsson ......... G06N 3/08 |
| 2019/0324458 | A1 | 10/2019 | Sadeghi et al. |
| 2021/0042394 | A1 | 2/2021 | Puranic et al. |
| 2021/0334767 | A1 | 10/2021 | Utke et al. |
| 2022/0024470 | A1 | 1/2022 | Patnala et al. |
| 2022/0074758 | A1* | 3/2022 | Sameer ............ G08G 1/096775 |
| 2022/0092893 | A1 | 3/2022 | Rosenbaum |
| 2022/0126864 | A1* | 4/2022 | Moustafa ........... B60W 60/0011 |
| 2022/0340148 | A1 | 10/2022 | Rosenbaum |
| 2023/0060300 | A1 | 3/2023 | Rosenbaum |
| 2023/0083255 | A1 | 3/2023 | Ebrahimi et al. |
| 2023/0154254 | A1 | 5/2023 | Thoele et al. |
| 2024/0142962 | A1* | 5/2024 | Ahmad .................. G06Q 10/20 |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2020097221 A1 * | 5/2020 ............ B60K 35/00 |

OTHER PUBLICATIONS

Treleaven et al., Computational Finance, IEEE Computer, vol. 43, Issue 12 (2010).

* cited by examiner

Vehicle Building Information

[SF1H3AFC7JNXYZ008] [Search]  ⊚ View Original   ⤓ DOWNLOAD SPECS ▼

| VIN | SF1H3AFC7JNXYZ008 | Engine Type | Engine Type |
|---|---|---|---|
| MAKE | Audi | Body Type | Body Type |
| MODEL | A6 | Drive Type | Drive Type |
| YEAR | 2018 | Transmission | Transmission |
| Features | ▶ | | |

Proactive Passenger Protection System
Park Distance Warning
Electronic Stability Control
*Blind Spot Warning*
Advanced Driver Assistance Feature
Side Airbag
360-Degree Camera System
Dynamic Headlight Range Control
Lane Keeping Assist > The ontology model is applied to original build sheets through the classification process. Manufacturer-specific build sheet terms are identified and converted to common terminology as specified in the model.

FIG. 2A

SYSTEMS AND METHODS OF DETERMINING EFFECTIVENESS OF VEHICLE SAFETY FEATURES

CROSS REFERENCE TO RELATED APPLICATION

This application claims the benefit under 35 U.S.C. § 119(e) of U.S. provisional patent application Ser. No. 63/285,754, filed Dec. 3, 2021, the entire disclosure of which is incorporated herein by reference.

FIELD OF THE DISCLOSURE

The present disclosure generally relates to vehicle safety and, more particularly, to systems and methods of determining the effectiveness of vehicle safety features.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Currently, many vehicles are equipped with smart safety features configured to improve the safety of the vehicle. However, it can be difficult to determine which smart safety features are most effective at preventing (or decreasing the frequency or severity of) vehicle accidents. Smart safety features may function differently in different environments, as well as in different types of vehicles. Further compounding these difficulties, combinations of smart safety features may have complementary functionality that improves effectiveness when used in combination or may have incompatible functionality that reduces effectiveness when used in combination. Improved techniques of determining effectiveness of smart safety features are therefore needed.

SUMMARY

The present embodiments relate to system, methods, and techniques for determining which smart safety features or which combinations of smart safety features are most effective at preventing (or decreasing the frequency or severity of) vehicle accidents.

In one aspect, a computer-implemented method for determining the effectiveness of vehicle safety features may be provided. The computer-implemented method may include, via one or more local or remote processors, servers, transceivers, sensors, and/or memory units, one or more of: (1) obtaining vehicle-specific build information for each of a plurality of vehicles manufactured by a plurality of original equipment manufacturers (OEMs), the vehicle-specific build information containing OEM-specific terminology associated with one or more smart safety features associated with each vehicle; (2) obtaining an ontology model mapping each smart safety feature to an OEM-specific terminology associated with the smart safety feature for each OEM; (3) applying the ontology model to the vehicle-specific build information to generate a translated vehicle build record for each of the plurality of vehicles, such that the OEM-specific terminology associated with each smart safety feature is replaced with OEM-agnostic terminology for the smart safety feature; (4) obtaining vehicle telematics data generated for each of the plurality of vehicles; (5) obtaining vehicle accident record information for a plurality of vehicle accidents involving one or more of the plurality of vehicles, wherein the vehicle accident record information is associated with usage of the smart safety features; (6) generating an effectiveness score associated with each smart safety feature, at least by analyzing a plurality of translated vehicle build records, vehicle telematics data, and vehicle accident records associated with each of the plurality of vehicles using a machine learning based regression estimator; and/or (7) causing an action to be implemented based upon the generated effectiveness score. The computer-implemented method may include additional, less, or alternate functionality or actions, including those discussed elsewhere herein.

In another aspect, a computing system for determining the effectiveness of vehicle safety features may include one or more local or remote processors (and/or transceivers, servers, and/or sensors) and one of more local or remote non-transitory program memories communicatively coupled to the one or more processors. The computing system may be configured to store executable instructions that, when executed by the one or more processors, cause the computer system to: (1) obtain vehicle-specific build information for each of a plurality of vehicles manufactured by a plurality of original equipment manufacturers (OEMs), the vehicle-specific build information containing OEM-specific terminology associated with one or more smart safety features associated with each vehicle; (2) obtain an ontology model mapping each smart safety feature to an OEM-specific terminology associated with the smart safety feature for each OEM; (3) apply the ontology model to the vehicle-specific build information to generate a translated vehicle build record for each of the plurality of vehicles, such that the OEM-specific terminology associated with each smart safety feature is replaced with OEM-agnostic terminology for the smart safety feature; (4) obtain vehicle telematics data generated for each of the plurality of vehicles; (5) obtain vehicle accident record information for a plurality of vehicle accidents involving one or more of the plurality of vehicles, wherein the vehicle accident record information is associated with usage of the smart safety features; (6) generate an effectiveness score associated with each smart safety feature, at least by analyzing a plurality of translated vehicle build records, vehicle telematics data, and vehicle accident records associated with each of the plurality of vehicles using a machine learning based regression estimator; and/or (7) cause an action to be implemented based upon the generated effectiveness score. The computer system and/or executable instructions may direct additional, less, or alternate functionality, including that discussed elsewhere herein.

In yet another embodiment, a tangible, non-transitory computer-readable storage medium may store computer-executable instructions for determining the effectiveness of vehicle safety features that, when executed by at least one processor of a computer system, cause the computer system to (1) obtain vehicle-specific build information for each of a plurality of vehicles manufactured by a plurality of original equipment manufacturers (OEMs), the vehicle-specific build information containing OEM-specific terminology associated with one or more smart safety features associated with each vehicle; (2) obtain an ontology model mapping each smart safety feature to an OEM-specific terminology associated with the smart safety feature for each OEM; (3) apply the ontology model to the vehicle-specific build information to generate a translated vehicle build record for each of the plurality of vehicles, such that the OEM-specific terminology associated with each smart safety feature is replaced with OEM-agnostic terminology for the smart safety feature; (4) obtain vehicle telematics data generated for each of the plurality of vehicles; (5) obtain vehicle accident record information for a plurality of vehicle accidents involving one or more of the plurality of vehicles, wherein the vehicle accident record information is associated with usage of the smart safety features; (6) generate an effectiveness score associated with each smart safety feature, at least by analyzing a plurality of translated vehicle build records, vehicle telematics data, and vehicle accident records associated with each of the plurality of vehicles using a machine learning based regression estimator; and/or (7) cause an action to be implemented based upon the generated effectiveness score. The computer-executable instructions may direct additional, less, or alternate functionality, including that discussed elsewhere herein.

The systems, methods, and instructions disclosed herein may be implemented by one or more servers, client computing devices, mobile computing devices, on-board computing devices associated with vehicles, or combinations thereof. Additional, fewer, or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments;

Figure 1:
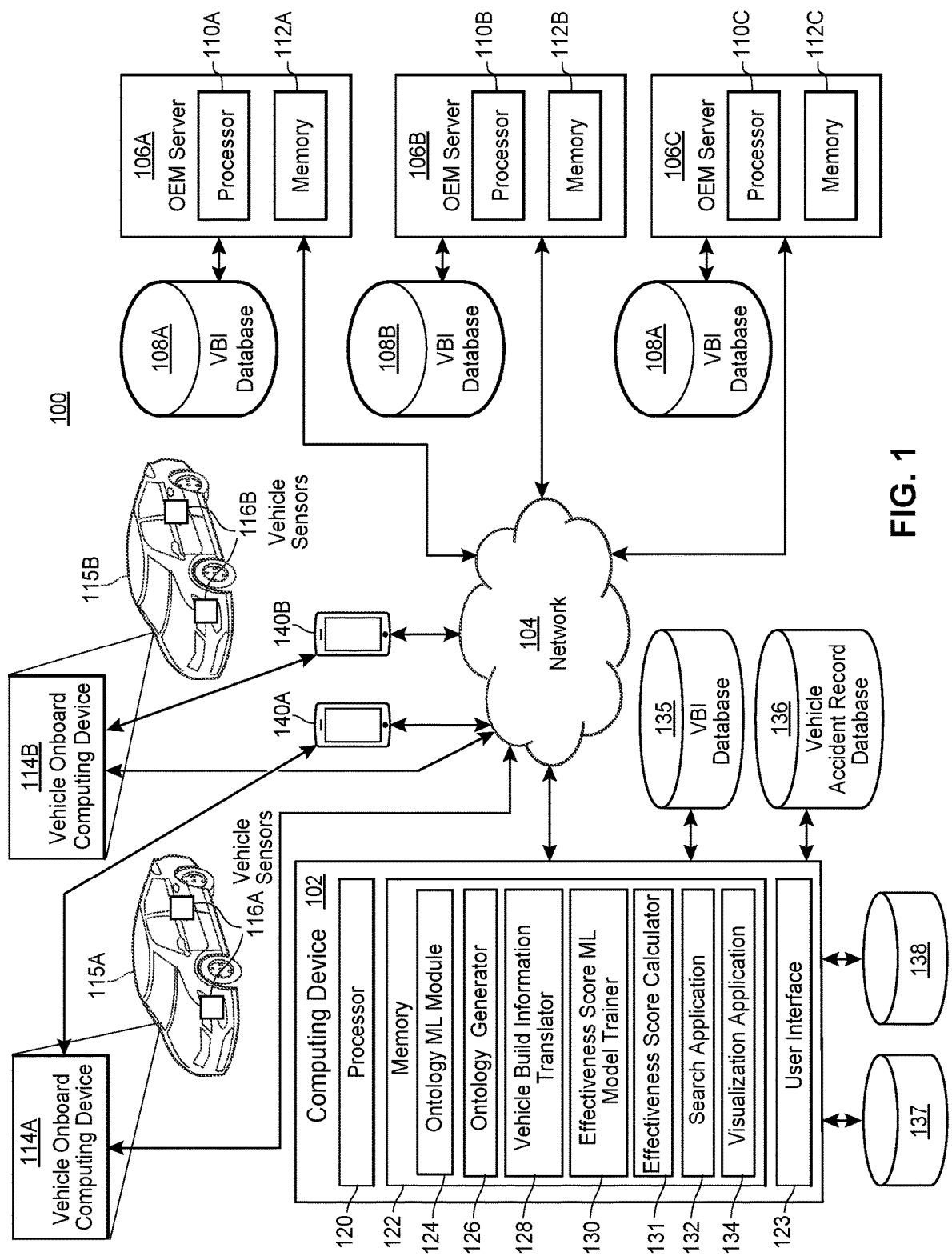
FIG. 1 illustrates a block diagram of an exemplary computer system for determining the effectiveness of vehicle safety features, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Currently, many vehicles are equipped with smart safety features configured to assist drivers and improve the safety of the vehicle (also called "advanced vehicle safety features" (AVSFs)). These smart safety features may include, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, driver assist technologies, semi-autonomous and/or autonomous technologies and systems, etc. However, it can be difficult to determine which smart safety features or which combinations of smart safety features are most effective at preventing (or decreasing the frequency or severity of) vehicle accidents.

While vehicle accident records may provide information indicating vehicle accident data sorted by vehicle identification number (VIN), VINs may not provide an indication of whether a vehicle is equipped with a particular smart safety feature. That is, while a VIN includes information such as the year, the make, and the model of the vehicle, there can be great variability in smart safety features even between vehicles of the same year, make, and model due to the highly customizable nature of smart safety features. Additionally, some vehicles may include aftermarket products equipped with smart safety features. The aftermarket smart safety features may be similar or different from the smart safety features provided by vehicle manufacturer. Furthermore, in many instances, smart safety features may be switched on or off by a vehicle operator. However, vehicle accident records currently do not include information indicating whether or not a particular smart safety feature was switched on or off at the time of an accident.

Moreover, even if the smart safety features of a given vehicle are known, it can be difficult to compare the effectiveness of smart safety features between vehicle manufacturers because different vehicle manufacturer often use different terminology for the same safety technology. For example, while many original equipment manufacturers (OEMs) manufacture vehicles enabled with blind spot detection, one OEM may call this feature "lane change assist," while another OEM calls this feature "blind spot monitor." Furthermore, in some examples, one OEM may use different terminology for the same feature in marketing (e.g., "presense") compared to in technical documents (e.g., "blind spot information system").

Systems and methods of determining the effectiveness of vehicle safety features are provided herein. In particular, vehicle build information obtained directly from a plurality of OEMs may be analyzed to generate an ontology mapping similar or same smart safety features between OEMs to a standardized naming convention or record. For instance, machine learning or natural language processing may be used to group similar terminology from different OEMs, e.g., based upon similarities between descriptions of each term and/or based upon similarities between the terms themselves. Using the generated ontology, build information from a variety of vehicles from different OEMs may be translated into a common language. For example, the terms "lane change assist," "blind spot monitor," "pre-sense," and "blind spot info system," as indicated in build information from vehicles from different OEMs, may each be translated to an umbrella term "blind spot detection."

VIN database records may be accessed to identify specific smart safety features installed on a particular vehicle. For example, the National Highway Traffic Safety Administration (NHTSA) VIN decode data and/or the Highway Loss Data Institute (HLDI) vehicle feature data and/or the Insurance Institute for Highway Safety (IIHS) crash rating data. The generated ontology mapping may be applied to the terminology utilized by the external VIN database records to translate the smart feature naming terminology used by OEMs to a common terminology. Accordingly, for each vehicle of the plurality of vehicles, values from the translated OEM information and the translated external VIN-specific databases may be analyzed to select the "best" value to assemble a standardized build sheet for each particular vehicle (i.e., a translated vehicle build information record) by pulling data from the best available source for each smart safety feature field.

Accordingly, the translated build information for each vehicle may be cross-referenced to vehicle accident or collision records associated with the vehicle's VIN. Using the translated build information and the vehicle accident record for each vehicle, a number, frequency, severity, etc. of accidents associated with each combination of one or more of the smart safety features may be calculated to determine an effectiveness score or scores for each smart safety feature or a combination of smart safety features. The effectiveness score may be correlated with effectiveness at preventing, avoiding, or decreasing a severity of a vehicle accident or collision, and/or decreasing claim frequency, vehicle reparability, and/or cost of vehicle repair following an accident or collision. In some examples, telematics data captured by sensors associated with the vehicle may be analyzed to determine, among other parameters, whether or not the smart safety feature was switched on at the time of the accident, and this determination may factor into the effectiveness score for the smart safety feature.

In some embodiments, the telematics data may be analyzed to determine conditions associated with vehicle driving style, such as vehicle speed at the time of the accident, accelerating and braking pattern, adhering to driving lane markings, adhering to the posted speed limit. Moreover, in some examples, a data log from a computing device associated with the vehicle may be analyzed to determine whether the smart safety feature had been updated at the time of the accident, or what version of software associated with the smart safety feature was used at the time of the accident, and this determination may factor into the effectiveness score for the smart safety feature as well.

In certain embodiments, environmental data at the time of the accident may be accessed, the environmental data including, for example, weather conditions, terrain parameters, road conditions, etc. The environmental data may be obtained from historical database(s), from the telematics data, or from a computing device associated with the vehicle user.

In particular, the effectiveness scores for various smart safety features or combinations of safety features may be compared, ranked, etc. Practically speaking, the effectiveness scores for the smart safety features or combinations of smart safety features of a given vehicle may be provided to consumers, who may use these effectiveness scores for smart safety features associated with various vehicles to determine which vehicles are safest (e.g., when renting a vehicle, when purchasing a vehicle, when being transported by a vehicle when using a taxi or ride share service, etc.). Moreover, the effectiveness scores for the smart safety features or combinations of smart safety features of a given vehicle may be provided to OEMs, who may use this information to improve smart safety features and/or to develop more effective smart safety features.

Furthermore, in some examples, the effectiveness scores for each of the smart safety features or combinations of smart safety features of a given vehicle may be used to determine an insurance rating score for the vehicle and/or an insurance rating score for an insured party associated with the vehicle. Furthermore, the effectiveness score or scores may be used to generate reparability predictions for vehicles, including damage extent, type, and cost. Such predictions may be utilized in determinations of insurance rating scores. Determining insurance ratings based upon the effectiveness scores for the smart safety features or combinations of smart safety features of a vehicle in this way improves upon conventional methods of determining insurance rating scores for vehicles, because conventionally, insurance rating scores for vehicles are simply based upon the make, model, and year of the vehicle, as indicated by the vehicle's VIN. However, with the introduction of smart safety features, there is now great variability in safety features even between vehicles of the same make, model, and year.

Consequently, conventional methods for determining insurance ratings for vehicles cannot account for specific information about which smart safety features are enabled for a particular vehicle. In contrast, the present disclosure provides ways of improving upon these conventional methods for determining insurance ratings by individualizing these ratings for specific vehicles by incorporating effectiveness scores for various smart safety features or combinations of smart safety features enabled for the vehicle.

Exemplary System for Determining Safety Effectiveness

Referring now to the drawings, FIG. 1 illustrates a block diagram of an exemplary computer system 100 for determining the effectiveness of vehicle safety features, in accordance with some embodiments. The high-level architecture illustrated in FIG. 1 may include both hardware and software applications, as well as various data communications channels for communicating data between the various hardware and software components, as is described below. The system may include a computing device 102 configured to communicate, e.g., via a network 104 (which may be a wired or wireless network), with OEM servers 106A, 106B, 106C associated with various OEMs. Although three OEM servers 106A, 106B, 106C associated with three separate OEMs are shown in FIG. 1, a greater or fewer number of OEM servers may be included in various embodiments. The OEM servers 106A, 106B, 106C may each respectively be associated with OEM databases 108A, 108B, 108C storing, inter alia, vehicle build information (e.g., in the form of vehicle build sheets) associated with vehicles manufactured by the OEM.

Furthermore the OEM servers 106A, 106B, 106C may each respectively include one or more processors 110A, 110B, 110C, such as one or more microprocessors, controllers, and/or any other suitable type of processor. The OEM servers 106A, 106B, 106C may each respectively further include a memory 112A, 112B, 112C (e.g., volatile memory, non-volatile memory) accessible by the respective one or more processors 110A, 110B, 110C, (e.g., via a memory controller). The respective one or more processors 110A, 110B, 110C may each interact with the respective memories 112A, 112B, 112C to obtain, for example, computer-readable instructions stored in the respective memories 112A, 112B, 112C. Additionally or alternatively, computer-readable instructions may be stored on one or more removable media (e.g., a compact disc, a digital versatile disc, removable flash memory, etc.) that may be coupled to the OEM servers 106A, 106B, 106C to provide access to the computer-readable instructions stored thereon. In particular, the computer-readable instructions stored on the respective memories 112A, 112B, 112C may include instructions for transmitting vehicle build information from the respective OEM databases 108A, 108B, 108C to the computing device 102 (e.g., via the network 104).

The network 104 may be a proprietary network, a secure public internet, a virtual private network or some other type of network, such as dedicated access lines, telephone lines, satellite links, cellular data networks, combinations of these. The network 104 may include one or more radio frequency communication links, such as wireless communication links with vehicle onboard computing device 114A, 114B. The network 104 may also include other wired or wireless communication links with other computing devices or systems. Where the network 104 may include the Internet, and data communications may take place over the network 104 via an Internet communication protocol.

The computing device 102 may further communicate with vehicle onboard computing device 114A, 114B associated with respective vehicles 115A, 115B. For example, the vehicle onboard computing device may interface with vehicle sensors 116A, 116B associated with respective vehicles 115A, 115B. The vehicle sensors 116A, 116B may include, e.g., accelerometers, gyroscopes, cameras or other image sensors, light sensors, microphones or other sound sensors, GPS receivers, or any other suitable sensors. In particular, the vehicle sensors 116A, 116B may be configured to capture telematics and/or environmental data associated with respective vehicle 115A, 115B. Telematics data may include, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data.

The computing device 102 may further communicate, via network 104, with personal computing device 140A, 140B. The vehicle onboard computing device 114A, 114B may further communicate, directly or via network 104, with respective personal computing device 140A, 140B of vehicle operators associated with respective vehicles 115A, 115B. For example, the sensors of the personal computing device 140A, 140B (not shown) such as cameras or other image sensors, accelerometers, gyroscopes, microphones or other sound sensors, GPS receivers, or any other suitable sensors may obtain telematics and/or environmental data associated with vehicle 115A, 115B, driver performance data or driver physiological data.

Although FIG. 1 shows two vehicles 115A, 115B, two associated vehicle onboard computing devices 114A, 114B, two sets of vehicle sensors 116A, 116B, and two personal computing devices 140A, 140B, any number of vehicles, vehicle onboard computing devices, vehicle sensors, and/or personal computing devices may be included in various embodiments. The components of the onboard computing devices 114A, 114B and the interactions between the onboard computing devices 114A, 114B, the vehicle sensors 116A, 116B, the personal computing devices 140A, 140B, and the computing device 102 are discussed below in more detail with reference to FIG. 7.

The personal computing device 140A, 140B may be any applicable portable computing devices of a user of a respective vehicle 115A, 115B, such as a driver or a passenger of a vehicle 115A, 115B. The personal computing device 140A, 140B may be a smartphone, a tablet, a personal computer, or any other computing device configured to communication via the network 104.

The onboard computing device 114A, 114B may store instructions for controlling the vehicle (e.g., controlling the braking, steering, headlights, cameras, or other components of the vehicle) in order to enable smart safety features such as, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, etc. For instance, the instructions may include instructions for controlling the respective vehicle 115A, 115B to enable smart safety features based upon inputs from the respective sensors 116A, 116B.

Furthermore, these instructions may include instructions for transmitting telematics data associated with respective vehicles 115A, 115B to the computing device 102 (e.g., via the network 104). Moreover, these instructions may include instructions for transmitting (e.g., via the network 104) indications of which smart safety features associated with the respective vehicle 115A, 115B were enabled or activated at various dates or times, either automatically or based upon a request from the computing device 102.

The computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120, (e.g., via a memory controller). Additionally, the computing device may include a user interface 123.

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as, e.g., an ontology ML module 124, an ontology generator 126, a vehicle build information translator 128, an effectiveness score ML model trainer 130 module, an effectiveness score calculator 131 module, a search application 132, and/or a visualization application 134.

For example, the ontology ML module 124 may train a machine learning model to group similar terminology from different OEMs, e.g., based upon similarities between descriptions of each term and/or based upon similarities between the terms themselves, using several known OEM-specific terms from each of a plurality of OEMs.

In general, training the machine learning model (and/or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The ontology generator 126 may apply the trained machine learning model to the vehicle build information from the OEM databases 108A, 108B, 108C in order to generate an ontology model mapping similar or same smart safety features between OEMs to OEM-specific terminology describing each feature for the OEMs associated with OEM servers 106A, 106B, 106C.

The vehicle build information translator 128 may apply the ontology model to the vehicle build information from the OEM databases 108A, 108B, 108C to translate the vehicle build information each of the different OEMs into a common language (i.e., by translating OEM-specific terminology to OEM-agnostic terminology). For example, the vehicle build information stored in the OEM database 108A may use the OEM-specific term "lane change assist," to describe a blind spot detection smart safety feature, while the vehicle build information stored in the OEM database 108B may use the OEM-specific term "blind spot monitor" to describe a blind spot detection feature that is substantially the same, the OEM database 108C may use the OEM-specific term "blind spot info system" to describe the same blind spot detection feature, etc. The vehicle build information translator 128 may translate each of these terms to an OEM-agnostic term for the smart safety feature, e.g., "blind spot detection smart safety feature." In particular, the vehicle build information translator 128 may store the translated vehicle build information in a vehicle build information (VBI) database 135.

Further, the vehicle build information translator 128 may apply the ontology model to vehicle-specific build information obtained from a VIN-specific feature database 137 associating each VIN with installed smart safety features to translate the vehicle-specific records into a common language, similarly to how the build information translator 128 applies the ontology model to the vehicle build information from the OEM databases 108A, 108B, 108C. The VIN-specific database may be, for example, NHTSA VIN decode data record or HLDI/IIHS vehicle feature data and crash rating data record or any other suitable database. The vehicle build information translator 128 may store the translated vehicle-specific build information in the VBI database 135. For each vehicle of the plurality of vehicles, values from the translated OEM information and the translated external VIN-specific databases may be further analyzed to select the "best" value to assemble a standardized build sheet for each particular vehicle (i.e., a translated vehicle build information record) by pulling data from the best available source for each smart safety feature field, as discussed in greater detail elsewhere herein.

In some embodiments, the one or more processors 120 may access and execute the instructions of the effectiveness score ML model trainer 130 module to train a machine learning (ML) model for calculating an effectiveness score associated with a smart feature (AVSF) or a combination of smart features (AVSFs) associated with a vehicle (e.g., for use by the effectiveness score calculator 131 module). Such ML model may be trained based upon one or more parameters, such as specification and usage data of the installed AVSFs for a particular vehicle, current vehicle telematics data, and current environmental data. The one or more processors 120 may save the trained model in the memory 122 for use by the effectiveness score calculator 131 module. In certain embodiments, as discussed below with reference to FIG. 7, a scoring model may be trained and stored at a vehicle onboard computing device 700 according to instructions stored in ML scoring model module 706 in a program memory 704.

The smart safety feature effectiveness score calculator 131 module may be trained by the effectiveness score ML model trainer 130 module utilizing the translated vehicle build information from the VBI database 135, along with information obtained from a vehicle accident record database 136 storing indications of accident history associated with various vehicles, vehicle telematics data from vehicle onboard computing device 114A, 114B (e.g., indicative of vehicle collisions, indicative of which AVSFs were operating during vehicle collisions, etc.), and/or environmental data obtained from either ML scoring model training database 138, vehicle onboard computing device 114A, 114B, or the personal computing devices 140A, 140B to calculate effectiveness scores for each AVSF or a combination of AVSFs. Training of the effectiveness score calculator ML model is described in greater detail later in this specification with reference to FIG. 8.

In some embodiments, a different approach for obtaining an effectiveness score may be used in place of or in addition to utilizing a trained ML model. For instance, an accident rate may be calculated for all vehicles associated with a particular OEM-agnostic term for a smart safety feature, and the effectiveness of the smart safety feature may be calculated based at least in part on this accident rate. In certain embodiments, the effectiveness score of AVSFs may be predicted using data science techniques, for example by analyzing claim and/or accident frequency, damage severity, etc. associated with AVSF usage.

Moreover, in some examples, the effectiveness score calculator 131 module may calculate a score indicative of the relevance of a given smart safety feature's performance in particular accidents. For instance, this score may indicate whether the smart safety feature's performance was likely relevant to a particular accident or collision, and/or whether the smart safety feature was likely operating as intended during a particular accident or collision. Moreover, in some examples, the effectiveness score calculator 131 module may calculate a percentage of fault associated with each smart safety feature for a particular accident or collision.

Figure 2B:
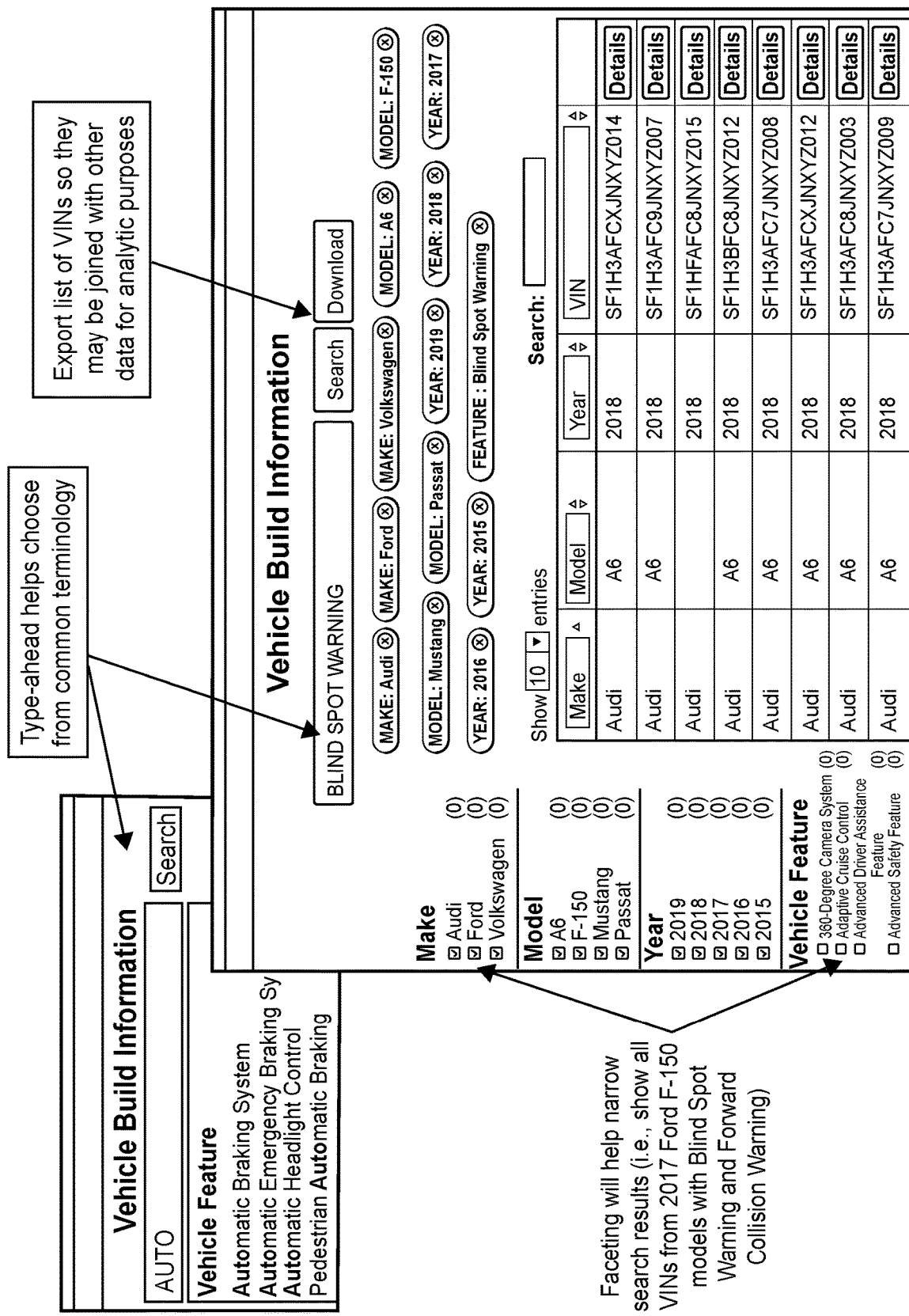
FIG. 2B illustrates an exemplary display of a user interface for searching for vehicles that have a particular type of smart safety feature, in accordance with some embodiments.

The search application 132 may provide a search feature to be displayed to a user via, e.g., a web interface or the user interface 123. In one example, the search application 132 may receive user input indicating a vehicle identification number (VIN) to be searched, and may search the vehicle build information to locate a matching vehicle and its associated smart safety features. Accordingly, the search application 132 may cause the user interface 123 to display, based upon the user input, a listing of smart safety features associated with the VIN, e.g., as shown in FIG. 2A. As another example, the search application 132 may receive user input indicating a smart safety feature to be searched, and may cause the user interface 123 to display, based upon the user input, a listing of vehicles having the smart safety feature and/or a listing of vehicle identification numbers (VINs) associated with those vehicles, e.g., as shown in FIG. 2B. In some examples, the user may use any terminology (e.g., OEM-specific terminology or OEM-agnostic terminology) for the feature, and the ontology model may be used to translate the user's input into OEM-agnostic terminology for the feature. Accordingly, the search application 132 may search the vehicle build information using the OEM-agnostic terminology and locate results to be displayed to the user.

Figure 3:
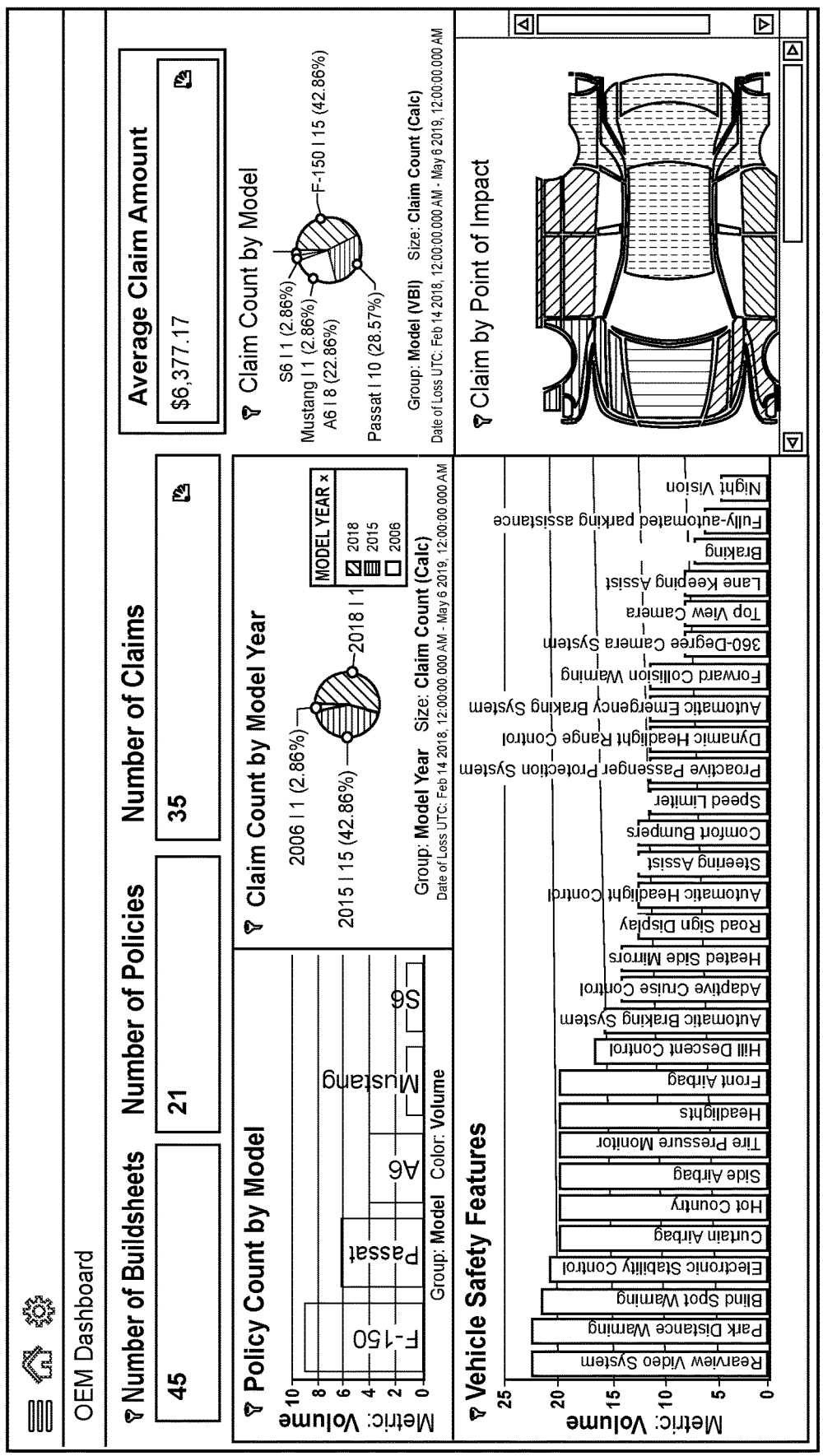
FIG. 3 illustrates an exemplary display of a user interface for a virtual portal for providing information about the performance of smart safety features to OEMs, in accordance with some embodiments.

The visualization application 134 may generate a virtual portal that provides information about the performance of various smart safety features and display the virtual portal to a user, e.g., via a web interface or via the user interface 123, e.g., as shown in FIG. 3. The visualization application 134 may cause the user interface 123 to display, for instance, smart feature effectiveness information and/or scores, as calculated by the effectiveness score calculator 131 module.

Additionally, the visualization application 134 may cause the user interface 123 to display information related to various vehicle models manufactured by a particular OEM to a user associated with the OEM (e.g., a representative of the OEM). For instance, visualization application 134 may cause the user interface 123 to display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc. Moreover, the visualization application 134 may cause the user interface 123 to display an indication of a number of claims at each point of impact for a particular vehicle model and/or for a particular AVSF. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

Moreover, the computer-readable instructions stored on the memory 122 may include instructions for carrying out any of the steps of the methods 400, 500, 600, and 900 described in greater detail below with respect to FIGS. 4, 5, 6, and 9, respectively. Furthermore, the computer-readable instructions stored on the memory 122 may include instructions for executing additional or alternative applications in various embodiments.

Figure 7:
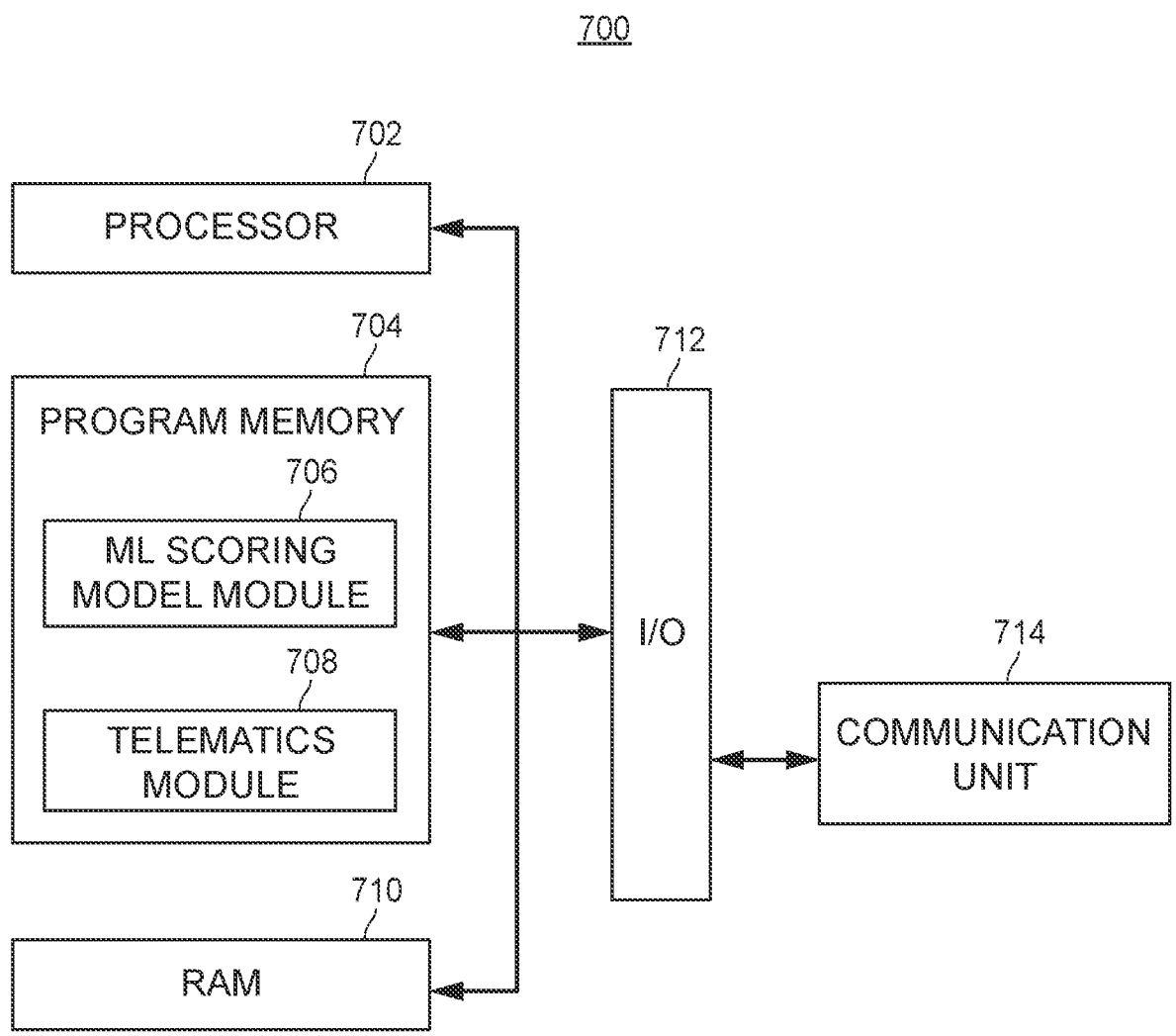
FIG. 7 illustrates a block diagram of components of an exemplary vehicle onboard computing device.

FIG. 7 is a block diagram of an example computing system 700 configured in accordance with certain described embodiments. The example computing system 700 may be used to implement all or part of the vehicle onboard computing device 114A, 114B. The computing system 700 may be a stand-alone computer coupled with a vehicle, a built-in vehicle computer, an embedded controller, or any other type of vehicle onboard computing device.

The computing system 700 includes, among other things, a processor 702, program memory 704, including ML scoring model module 706 and telematics module 708, RAM 710, input/output (I/O) circuit 712, and communication unit 714, all of which may be interconnected via an address/data bus 718. It should be appreciated that although FIG. 7 depicts only one processor 702, the computing system 700 may include multiple processors 702. The processor 702 may be a semiconductor based (e.g., silicon based) component. Example processors 702 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. Similarly, the computing system 700 may include multiple memories 704 and multiple RAMs 710.

The RAM 710 and program memory 704 may be implemented as semiconductor memories, magnetically readable memories, or optically readable memories, for example. Although the I/O circuit 712 is shown as a single block, it should be appreciated that the I/O circuit 712 may include a number of different types of I/O circuits.

The program memory 704 may include any number or type of volatile or non-volatile tangible, non-transitory, machine-readable storage medium or disks, such as semiconductor memory, magnetically readable memory, optically readable memory, a hard disk drive (HDD), an optical storage drive, a solid-state storage device, a solid-state drive (SSD), a read-only memory (ROM), a random-access memory (RAM), a compact disc (CD), a CD-ROM, a DVD, a Blu-ray disk, a redundant array of independent disks (RAID) system, a cache, a flash memory, or any other storage medium or storage disk in which information may be stored for any duration (e.g., permanently, for an extended time period, for a brief instance, for temporarily buffering, for caching of the information, etc.). For example, the program memory 704 may store software and/or machine-readable instructions that may be executed by the processor 702 to implement, for example, the vehicle sensors 116A, 116B and/or, more generally, the vehicle 115A, 115B of FIG. 1.

The I/O circuit 712 enables receipt of user input and communication of output data as well as communication with other systems (e.g., the computing device 102 and the personal computing device 140A, 140B of FIG. 1). The I/O circuit 712 may include any number and/or type of I/O circuits or components that enable the processor 702 to communicate with peripheral I/O devices (e.g., the vehicle sensors 116A, 116B of FIG. 1) or other systems. Example I/O circuit 712 may include a universal serial bus (USB) interface, a Bluetooth® interface, a near field communication (NFC) interface, a serial interface, and/or an infrared transceiver. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (e.g., a mouse, a trackball, a capacitive touch pad, a joystick, etc.), a speaker, a microphone, a printer, a button, etc.

The example network interface of the I/O circuit 712 includes any suitable type of wired and/or wireless network interface(s) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a coaxial cable modem, a digital subscriber line (DSL) modem, a dialup modem, or any other suitable communication protocols or standards via a network, for example the network 104.

The exemplary computing system 700 may include a number of software applications stored in program memory 704. The computer-readable instructions stored on the program memory 704 of the computing system 700 may include instructions for controlling the respective vehicle (e.g., controlling the braking, steering, headlights, cameras, or other components of the vehicle) in order to enable smart safety features such as, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, etc. For instance, the instructions may include instructions for controlling the respective vehicle 115A, 115B to enable smart safety features based upon inputs from the respective sensors 116A, 116B.

The program memory 704 of the computing system 700 may include the ML scoring model module 706 and the telematics module 708. Additional or alternative modules and/or software applications may be stored at and executed by the processor 702 in various embodiments.

In some embodiments, the ML scoring model module 706 may include machine learning applications for processing data according to supervised machine learning, unsupervised machine learning, or reinforcement machine learning techniques to develop and implement models used for calculating the effectiveness score of AVSFs or combinations of AVSFs, as described in more detail below with reference to FIG. 8.

The telematics module 708 may include applications for obtaining, processing, and/or storing telematics data captured by the vehicle sensors 116A, 116B. In certain embodiments, the telematics module 708 may include instructions to determine conditions associated with vehicle driving style based upon telematics data, such as vehicle speed at the time of the accident, accelerating and braking pattern, adhering to driving lane markings, adhering to the posted speed limit, or data associated with driver physiological parameters. Moreover, these instructions may control transmission (e.g., via the network 104) of indications of which smart safety features associated with the respective vehicle 115A, 115B were enabled or activated at various dates or times, either automatically or based upon a request from the computing device 102. Furthermore, these instructions may control transmission of telematics data associated with respective vehicles 115A, 115B to the computing device 102 (e.g., via the network 104).

The various modules can provide information to, and receive information from, other modules. Accordingly, the described modules may be regarded as being communicatively coupled. Communications between modules may be achieved through signal transmissions (e.g., over appropriate circuits and buses) that connect the modules.

In certain embodiments in which multiple modules are configured at different times, communications between such modules may be achieved, for example, through the storage and retrieval of information in memory structures to which the multiple modules have access, such as program memory 704. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

Additionally or alternatively, computer-readable instructions may be stored on one or more removable media (e.g., a compact disc, a digital versatile disc, removable flash memory, etc.) that may be coupled to each computing system 700 of the vehicle onboard computing device 114A, 114B to provide access to the computer-readable instructions stored thereon.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments. For instance, "lane change assist and lane keeping system," from the vehicle build sheet of a vehicle manufactured by a particular OEM, may be translated to the OEM-agnostic term "blind spot warning." In particular, FIG. 2A illustrates an example display of a user interface (e.g., user interface 123) showing the results of a search for a vehicle having a particular vehicle identification number (VIN). Accordingly, using this user interface, a user who looks up a particular VIN may see results indicating the OEM-agnostic terminology for smart safety features that are associated with the vehicle having the particular VIN.

FIG. 2B illustrates an exemplary display of a user interface (e.g., user interface 123) for searching for vehicles that have a particular type of smart safety feature, in accordance with some embodiments. When a user searches for a particular feature using the user interface shown in FIG. 2B, using OEM-agnostic terminology or any OEM-specific terminology for the feature, the user interface may display a listing of all vehicles (and/or the VINs associated therewith) associated with that feature. In other words, the user may use any terminology for the feature, and the ontology model may be used to translate the user's search into OEM-agnostic terminology for the feature. Accordingly, the translated vehicle build information may be searched to locate vehicles associated with the feature, and the VINs for vehicles associated with the feature may be displayed to the user.

For instance, in the context of an insurance provider, the search features shown at FIGS. 2A and 2B may be utilized, e.g., in order to analyze loss data for setting rates for vehicles with certain features, to apply rating groups based upon vehicle features, to verify the presence of vehicle features for claim processing and/or fraud-detection purposes, and to analyze the effectiveness and/or performance of various vehicle features.

FIG. 3 illustrates an exemplary display of a user interface (e.g., user interface 123) for a virtual portal for providing information about the performance of smart safety features to OEMs, in accordance with some embodiments. For example, using the user interface shown, information related to various vehicle models manufactured by the OEM may be displayed for an OEM user (e.g., a representative of the OEM). For instance, the user interface may display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc.

The user interface shown in FIG. 3 may further display an indication of a number of claims at each point of impact for a particular vehicle model and/or for a particular smart safety feature. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

For instance, in the context of an OEM, the virtual portal shown at FIG. 3 may be utilized, e.g., in order to inform future vehicle design decisions of vehicle feature sets, to understand the effectiveness of vehicle features and/or repair costs, and/or to factor insurance costs into the "total cost of ownership" for their vehicles.

Exemplary Safety Effectiveness Determination

Figure 4:
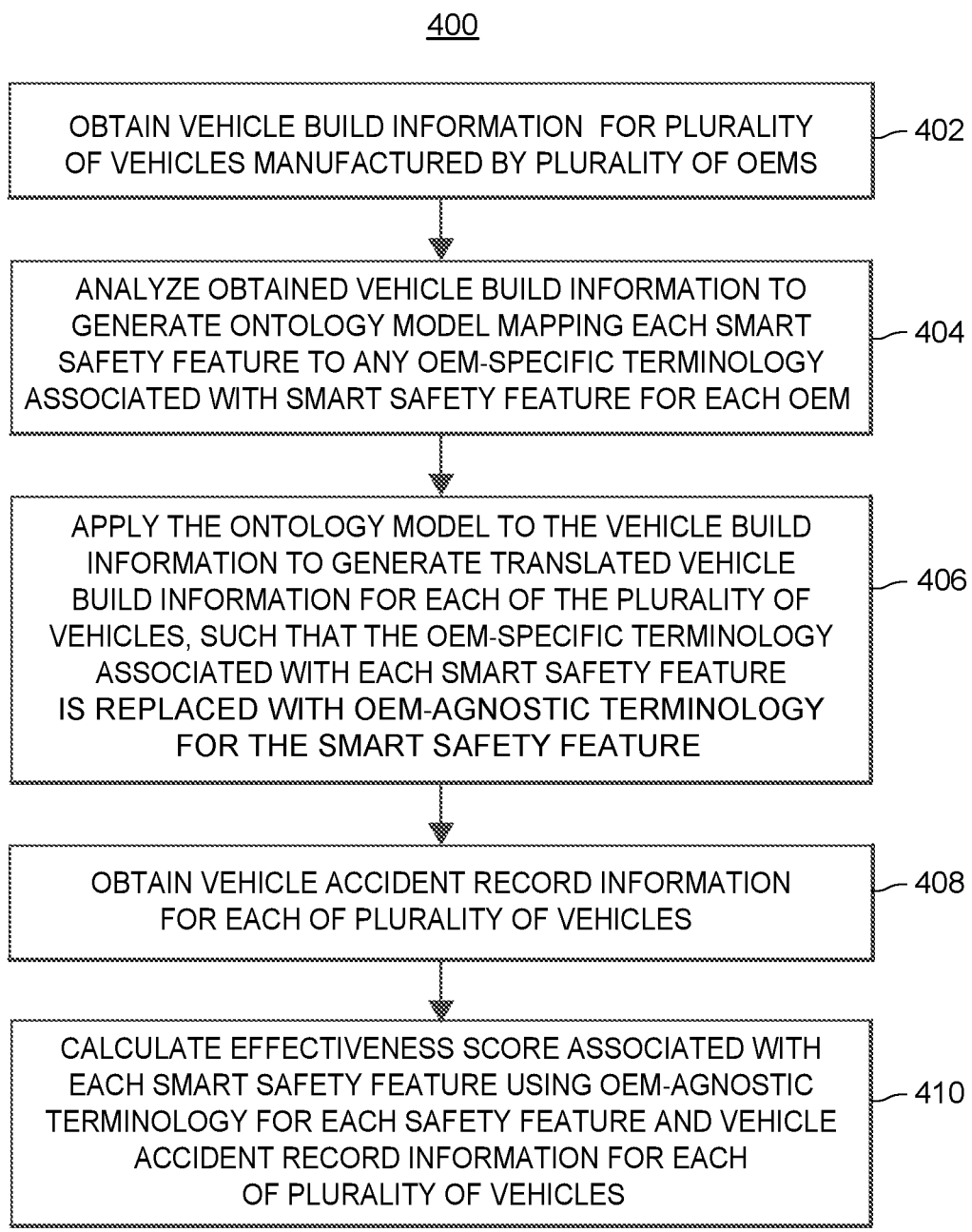
FIG. 4 illustrates a flow diagram of an exemplary computer-implemented method for determining the effectiveness of vehicle safety features, in accordance with some embodiments.

FIG. 4 illustrates a flow diagram of an exemplary method 400 for determining the effectiveness of vehicle safety features, in accordance with some embodiments. One or more steps of the method 400 may be implemented as a set of instructions stored on a computer-readable memory and executable on one or more processors. While "smart safety features" are discussed herein, the method 400 may be applied to determine the effectiveness of any kind of vehicle safety features.

Vehicle build information for a plurality of vehicles manufactured by a plurality of OEMs may be obtained (block 402), e.g., from databases associated with each OEM. For example, the vehicle build information obtained from each OEM may include information from vehicle build sheets for each individual vehicle manufactured by that OEM, with each vehicle build sheet listing all features of the individual vehicle.

The vehicle build information may contain, for instance OEM-specific terminology associated with one or more smart safety features associated with each vehicle. For instance, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another examiner, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed (block 404) by a processor to generate an ontology model mapping each smart safety feature to any OEM-specific terminology associated with the smart safety feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained using OEM-specific terminology associated with each of a plurality of known smart safety features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each smart safety feature for each OEM.

The ontology model may be applied (block 406) to the vehicle build information (e.g., as shown in FIG. 2A) to generate translated vehicle build information for each of the plurality of vehicles, such that the OEM-specific terminology associated with each smart safety feature is replaced with OEM-agnostic terminology for the smart safety feature. For instance, wherever OEM-specific terms such as the OEM-specific terms: "lane change assist," "blind spot info system" and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

Vehicle accident record information may be obtained (block 408) for each of the plurality of vehicles. The vehicle accident record information may include, e.g., a number of accidents, a frequency of accidents, or a severity of accidents associated with each of the plurality of vehicles or associated with each combination of one or more of the smart safety features. Moreover, the vehicle accident record information may include dates and/or times associated with accidents associated with each of the plurality of vehicles.

An effectiveness score may be calculated (block 410) for each smart safety feature using the OEM-agnostic terminology for each smart safety feature associated with each vehicle and the vehicle accident record information for each vehicle. That is, by using OEM-agnostic terminology, effectiveness scores may be calculated for particular types of safety features present in vehicles manufactured by a variety of different OEMs. For instance, the effectiveness of blind spot detection features in general may be calculated for a plurality of vehicles associated with various OEMs. In some examples, these effectiveness scores may be generated or scored as percentages (e.g., 88% effective, 50% effective), or on a numerical scale (e.g., on a scale of 1-10).

Generally speaking, a higher effectiveness score may be calculated for smart safety features that are associated with vehicles that have fewer, less frequent, and/or less severe accidents or collisions. In some examples, calculating the effectiveness score may include obtaining vehicle telematics data and/or other data indicating whether smart safety features were activated and/or enabled at various dates or times for each of the plurality of vehicles. For instance, the vehicle telematics data and the vehicle accident record information for each vehicle may be used to determine whether a smart safety feature was activated or deactivated at a date and/or time associated with a vehicle accident.

Additionally, if a smart safety feature of a vehicle was deactivated at a date and/or time of an accident associated with the vehicle, then the data from that accident may not be included in the calculation of the effectiveness score for that smart safety feature, but if the smart safety feature was activated at the date and/or time of the accident, then the data from that accident may be included in the calculation of the effectiveness score for that smart safety feature. In some examples, the telematics data may be used to determine whether a smart feature was updated prior to a date and/or time associated with a vehicle accident, and/or when the smart feature was last updated prior to the accident, and this determination may be factored into the calculation of the effectiveness score for the smart safety feature.

Additionally, in some examples, calculating the effectiveness score may be based upon an operational design domain of the safety feature, the road upon which the vehicle was operating and/or the environment in which the vehicle was operating at the date and/or time of the accident. Generally speaking, an operational design domain for a safety feature may include operating conditions under which the safety feature is specifically designed to function, including, but not limited to, environmental, geographical, and time-of-day restrictions, and/or the requisite presence or absence of certain traffic or roadway characteristics. For instance, an effectiveness score may be calculated for a specific safety feature in a specific driving environment. For instance, in some examples, the effectiveness score for a given safety feature may be calculated differently for vehicles operating on a divided highway than for vehicles operating on a city street. As another example, an effectiveness score may be calculated for a specific safety feature at night compared to during the day, on roads with a steep incline compared to flat roads, or for various other operational design domains.

Furthermore, in some examples, an effectiveness score may be calculated for a combination of smart safety features. For instance, in some examples, two or more smart safety features may be particularly effective when used in combination. Accordingly, individual effectiveness scores may be calculated for individual smart safety features, while combined effectiveness scores may be calculated for certain combinations of smart safety features. For example, a combined effectiveness score may be calculated for vehicles having both a blind spot detection feature and an adaptive cruise control feature.

Moreover, in some examples, the method 400 may include determining an insurance rating for a particular vehicle based upon the effectiveness scores associated with each smart safety feature associated with the vehicle, and/or based upon a particular combination of smart safety features associated with the vehicle. For example, insurance customers who own vehicles that have smart safety features with high effectiveness scores may be eligible for lower rates or for certain discounts.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, life, health, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Computer-Implemented Methods

Figure 5:
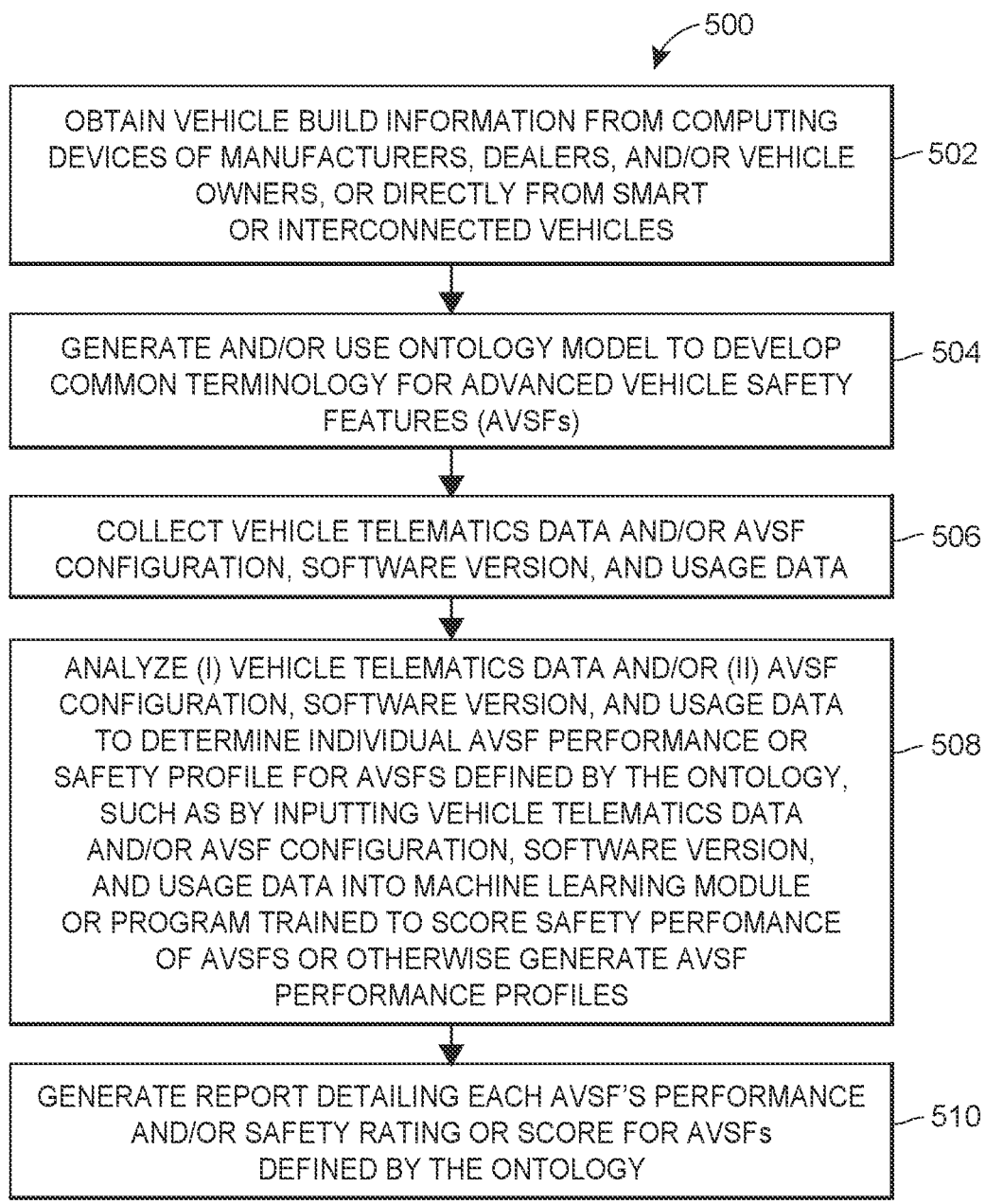
FIG. 5 illustrates an exemplary computer-implemented method of analyzing performance of advanced vehicle safety features.

FIG. 5 illustrates an exemplary computer-implemented method of analyzing performance of advanced vehicle safety features 500. The method 500 may include, via one or more processors and/or associated transceivers, obtaining, collecting, or receiving (such as via wireless communication or data transmission over one or more radio frequency links) vehicle build information for multiple automobiles from computing devices associated with vehicle manufacturers, dealerships, repair shops, and/or vehicle owners, or directly from smart vehicles, autonomous vehicles, and/or other vehicles configured for wireless communication with other computing devices 502. The vehicle build information may include one or more advanced vehicle safety features (AVSFs) as described and discussed elsewhere herein.

The method 500 may include, via one or more processors and/or associated transceivers, generating and/or using an ontology module to develop a common terminology for advanced vehicle safety features (AVSFs) 504, such as described and detailed elsewhere herein. For instance, different OEMs may use different terminology for similar vehicle safety features. The ontology may convert the different terminology from the OEMs into a common vocabulary.

The method 500 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.), and/or (ii) AVSF configuration, software version, and/or usage data 506.

The AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 500 may include, via one or more processors, analyzing (i) the vehicle telematics data, and/or (ii) the AVSF configuration, software version, and/or usage data to determine an individual advanced vehicle safety feature performance or safety profile for AVSFs defined by the ontology 508. In one embodiment, the vehicle telematics data, and/or the AVSF configuration, software version, and/or usage data may be input into a machine learning program, module, model, or algorithm trained to determine an AVSF performance or safety profile or score based upon vehicle telematics data, and/or AVSF configuration, software version, and/or usage data. As an example, when a processor determines that an AVSF is in use, vehicle operation may be monitored to determine whether the AVSF and/or vehicle is operating or performing as expected or designed. The AVSF, and/or the safety performance thereof, may then be assigned a score and a performance profile of the AVSF updated.

In general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 500 may include, via one or more processors, generating a virtual report detailing each AVSF's performance and/or safety rating or score for AVSFs defined by the ontology 510. The virtual report may be shared with vehicle owners, dealerships, repair shops, and/or OEMs via a website or virtual portal. The method 500 may include additional, less, or alternate actions, including those discussed elsewhere herein.

Figure 6:
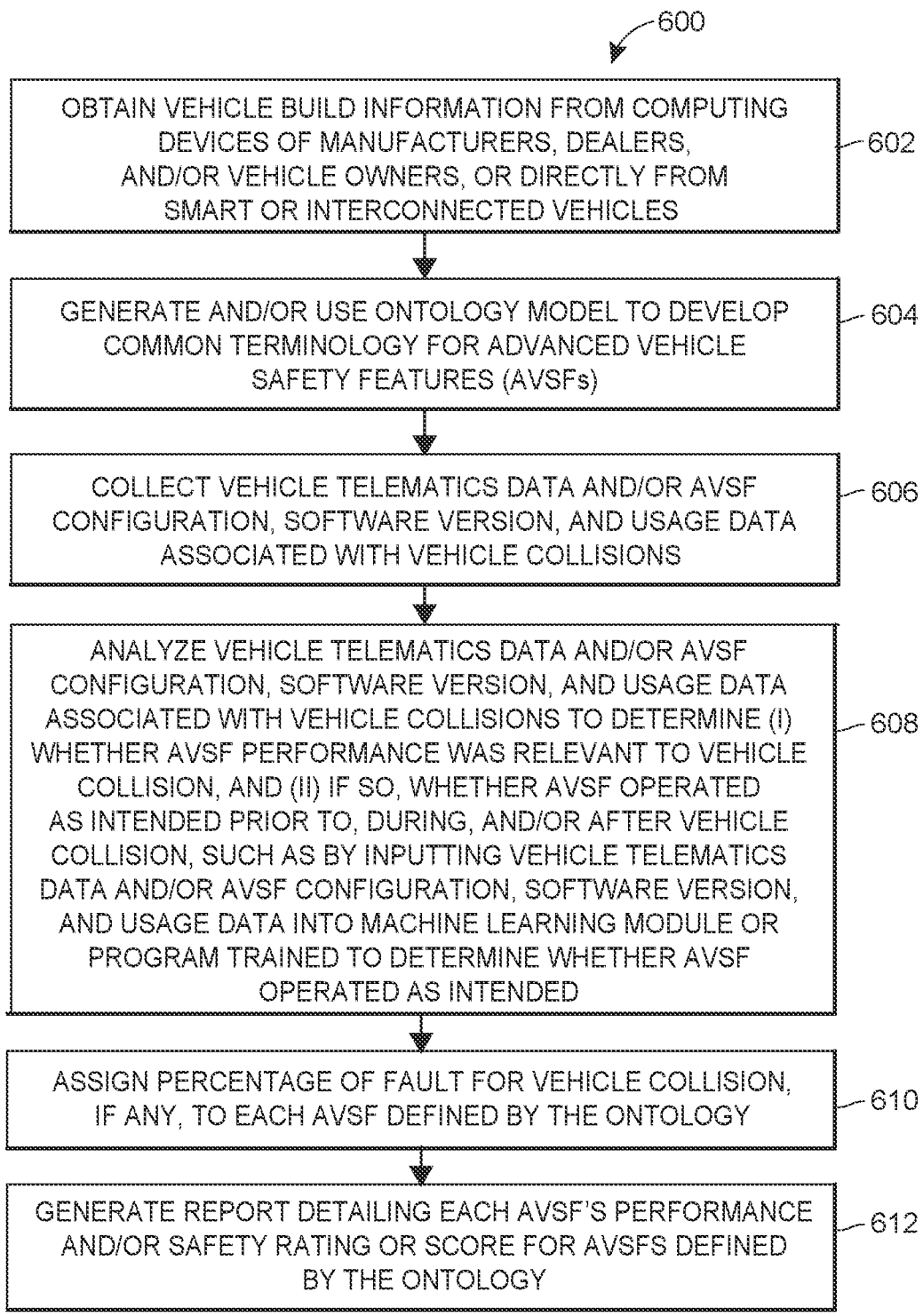
FIG. 6 illustrates another exemplary computer-implemented method of analyzing performance of advanced vehicle safety features.

FIG. 6 illustrates another exemplary computer-implemented method of analyzing performance of advanced vehicle safety features 600. The method 600 may include, via one or more processors and/or associated transceivers, obtaining, collecting, or receiving vehicle build information for multiple automobiles from computing devices associated with vehicle manufacturers, dealerships, repair shops, and/or vehicle owners, or directly from smart vehicles, autonomous vehicles, and/or other vehicles configured for wireless communication with other computing devices 602, such as described with respect to FIG. 5 above. Also as discussed with respect to FIG. 5 above, the method 600 may include, via one or more processors and/or associated transceivers, generating and/or using an ontology module to develop a common terminology for advanced vehicle safety features (AVSFs) 604.

The method 600 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.) associated with (such as collected prior to, during, and/or after) a vehicle collision, and/or (ii) AVSF configuration, software version, and/or usage data associated with (such as collected prior to, during, and/or after) a vehicle collision 606.

As noted above during the discussion of FIG. 5, the AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 600 may include, via one or more processors, analyzing (i) the vehicle telematics data associated with a vehicle collision, and/or (ii) the AVSF configuration, software version, and/or usage data associated with the vehicle collision to determine an individual advanced vehicle safety feature performance or safety profile for AVSFs defined by the ontology 608. In one embodiment, the vehicle telematics data associated with the vehicle collision, and/or the AVSF configuration, software version, and/or usage data associated with the vehicle collision may be input into a machine learning program, module, model, or algorithm trained to determine an AVSF performance or safety profile or score based upon vehicle telematics data associated with the vehicle, and/or AVSF configuration, software version, and/or usage data associated with the vehicle collision. As an example, when a processor determines that an AVSF is in use, vehicle operation may be monitored to determine whether the AVSF and/or vehicle is operating or performing as expected or designed prior to, during, and/or after a vehicle collision.

As an example, when a processor determines that an AVSF is in use, vehicle operation may be monitored to determine whether the performance of the AVSF was relevant to a collision. For instance, determining whether the AVSF and/or vehicle is operating or performing as expected or designed prior to, during, and/or after the vehicle collision may include inputting vehicle telematics data and/or AVSF configuration, software version, and usage data into machine learning module or program trained to determine whether the AVSF and/or vehicle is operating or performing as expected or designed. Similarly, determining whether the performance of the AVSF was relevant to the collision may include inputting vehicle telematics data and/or AVSF configuration, software version, and usage data into machine learning module or program trained to determine whether the performance of the AVSF was relevant to the collision. The AVSF, and/or the safety performance thereof, may then be assigned a score and a performance profile of the AVSF updated.

As discussed above with respect to FIG. 5, in general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 600 may include, via one or more processors, assigning a percentage of fault for a vehicle collision to each AVSF defined by the ontology based upon the analysis of the telematics data and AVSF data associated with the vehicle collision or collisions. After which, as discussed with FIG. 5, the method 600 may include, via one or more processors, generating a virtual report detailing each AVSF's performance and/or safety rating or score for AVSFs defined by the ontology 612. The virtual report may be shared with vehicle owners, dealerships, repair shops, and/or OEMs via a website or virtual portal. The method 600 may include additional, less, or alternate actions, including those discussed elsewhere herein.

Exemplary Machine Learning Modeling Method

Figure 8:
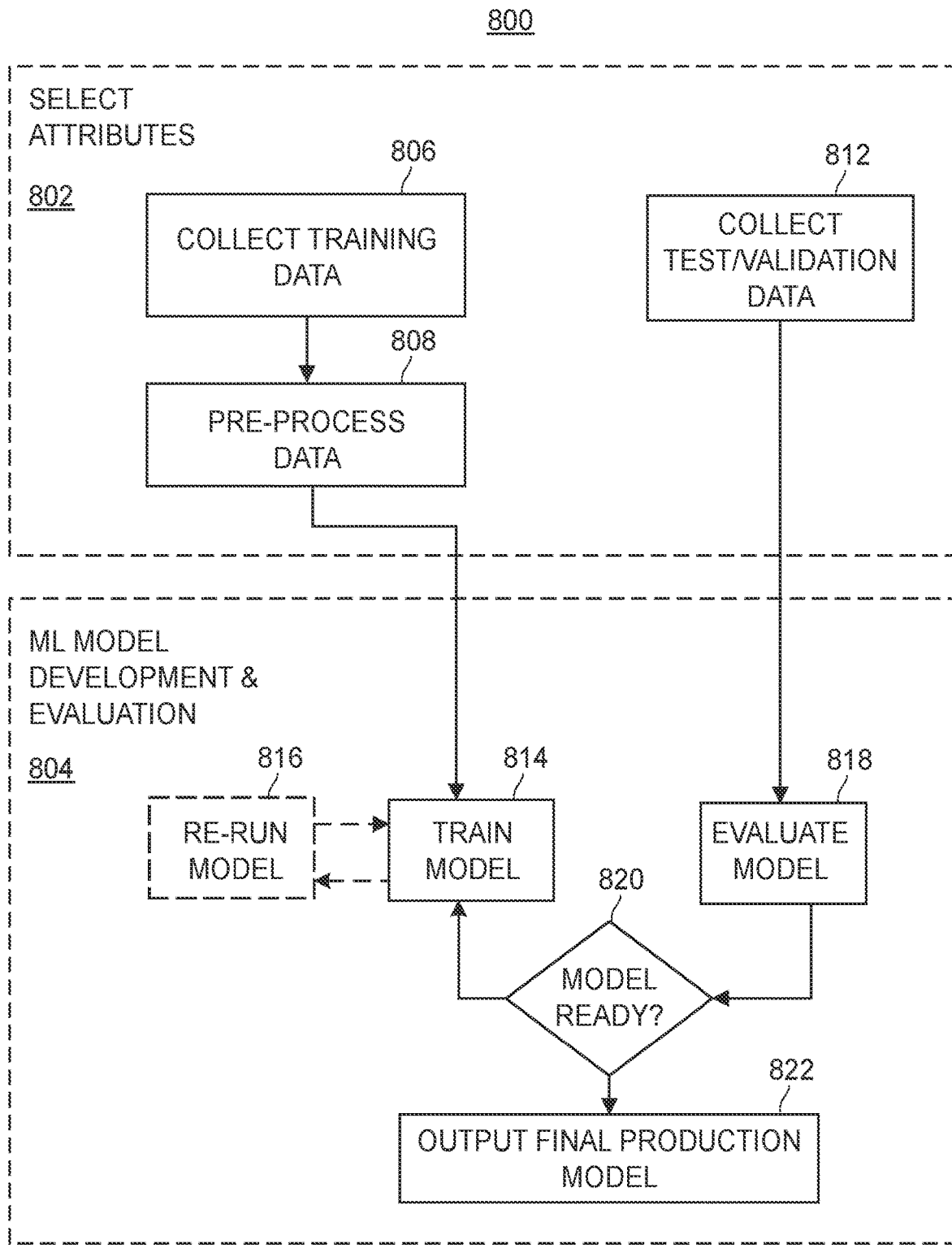
FIG. 8 illustrates a flow diagram of an exemplary computer-implemented method for creating a machine learning model from training data.

FIG. 8 is a block diagram of an exemplary machine learning modeling method 800 for training and evaluating a machine learning (ML) model (such as a neural network model) for determining and generating an effectiveness score or scores associated with each advanced vehicle safety feature (AVSF) associated with a vehicle based upon the specification and usage data of the installed AVSFs for a particular vehicle, current vehicle telematics data, and current environmental data. The ML model for determining and generating an effectiveness score may also be referred to herein as the scoring model.

In certain embodiments, the scoring model may determine and generate an effectiveness score associated with combinations of a plurality of AVSFs (e.g., blind spot warning and lane departure warning). Analyzing effectiveness of combinations of AVSFs provides an insight into how AVSFs interact under different conditions (e.g., environmental conditions or conditions attributed to a driving style) to negatively or positively impact vehicle safety.

The effectiveness score may be optimized in real time for a particular driving style of a particular vehicle depending on the installed AVSFs, operational telematics data, and current driving conditions. Although predictive models may be generated by other techniques, the use of machine learning techniques is particularly useful in identifying and evaluating salient features in large datasets.

In one embodiment, the model "learns" an algorithm capable of calculating or predicting the effectiveness score of an AVSF to incentivize a driver to enable or utilize the available safety features and ultimately decrease the frequency and severity of automotive accidents and/or collisions, and therefore reduce the associated personal injuries and property damage. In certain embodiments, the scoring model may be trained to generate an effectiveness score or scores associated with combinations of at least two AVSFs associated with a vehicle. At a high level, the machine learning modeling method 800 includes a block 802 for preparation of model input data and a block 804 for model training and evaluation. Depending on an embodiment, the scoring model training, storage, and implementation may be performed at the computing device 102 or the vehicle onboard computing device, such as 114A, 114B.

In certain embodiments, the training, storage, and implementation steps of the scoring model may be performed at different computing devices or servers. For example, the scoring model may be trained at the computing device 102 and stored and implemented at the onboard computing device 114A, 114B. In some embodiments, the scoring model may be trained, stored, and implemented at the vehicle onboard computing device 114A, 114B or at the personal computing device 140A, 140B. The scoring model may be further trained at a storing device, to further refine the predictions for a particular vehicle or for a particular user.

Depending on implementation, one or more scoring models may be trained at the same time. The different trained models may be further operated separately or in conjunction. Specific attributes in the training data sets may determine for which particular model each data set will be used. The said determination may be made on attributes such as specific environmental factors, the features of the installed AVSFs, or specific driving and/or vehicle performance characteristics. For example, one model may be utilized for daytime driving, another model may be utilized for nighttime driving, and yet another model may be utilized for daytime driving during a snow storm, etc.

To increase specificity of predictions for a particular driver, different models may be further refined for particular drivers. For example, multiple ML scoring models 706 may be stored at an onboard computing device 114A, 114B of a vehicle that can be operated by multiple drivers (for example, a shared company vehicle or a shared family vehicle). The processor 702 may access a dedicated scoring model for each of the multiple drivers. The driver-dedicated scoring model may be retrieved manually, for example, by the driver making a selection via user interface (not shown) of the onboard computing device 114A, 114B.

Alternatively, the driver-dedicated scoring model may be retrieved automatically, for example, by the processor 702 making a selection based upon parameters detected at vehicle sensors 116A, 116B. For instance, the sensors may detect weight, torso height, image of a face, driver seat position parameters, or driving patterns of the driver, and the processor 702 may further analyze the detected data to predict a specific driver. For the analysis, the processor 702 may utilize an ML algorithm, an image processing algorithm, or any other suitable methods. Training multiple models may provide an advantage of expediting calculations and further increasing specificity of prediction for each model's particular instance space.

Depending on implementation, the ML model may implement supervised learning, unsupervised learning, or semi-supervised learning. Such learning paradigms may include reinforcement learning. Supervised learning is a learning process for learning the underlying function or algorithm that maps an input to an output based upon example input-output combinations. A "teaching process" compares predictions by the model to known answers (labeled data) and makes corrections in the model. The learned algorithm is then able to make predictions of outputs based upon the inputs. In such embodiments, the AVSF data may be labeled according to the corresponding telematics parameters and environmental conditions, and an effectiveness of an AVSF in preventing vehicle accidents (e.g., depending on the ability to keep a safe distance from other vehicles, preventing unsafe lane changes, braking in time to prevent collision, etc.). Unsupervised learning is a learning process for generalizing the underlying structure or distribution in unlabeled data.

In certain embodiments utilizing unsupervised learning, the system may rely on unlabeled AVSF, telematics, environmental data, and unlabeled vehicle accident record data, or some combination thereof. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the order data and delivery data, depending on the embodiment.

The block 802 may include any one or more blocks or sub-blocks 806-810, which may be implemented in any suitable order. At the block 806, the effectiveness score ML model trainer 130 module, executed by processor 120 according to instructions on program memory 122, may obtain from vehicle accident record database 136 and/or the ML scoring model training database 138 one or more data sets of vehicle accident records and the associated vehicle-specific AVSF data and the then-current telematics and environmental conditions data.

Thus, the training data sets for training the selected scoring model may include an AVSF data set, indicative of one or more AVSFs associated with a vehicle (e.g., installed AVSFs, their configurations, software version, etc.), a telematics data set indicative of one or more vehicle telematics attributes associated with the vehicle (e.g., AVSF usage data, vehicle speed, acceleration and braking patterns, vehicle maintenance requirements, corresponding GPS data, etc.), and an environmental data set indicative of one or more environmental conditions associated with vehicle telematics data and AVSF usage data (e.g., precipitation, wind speed, temperature, visibility conditions, road conditions, traffic conditions, etc.), and the corresponding vehicle accident record details indicative of one or more accident details patterns (e.g., collision type, vehicle damage details, personal injury details, property damage details, etc.) and/or claim patterns (e.g., claim frequency, severity, vehicle repair or replacement costs, property repair or replacement costs, etc.) associated with each combination of one or more of the AVSFs.

In certain embodiments, the training data sets may include data indicative of a vehicle driver's physiological data correlated with vehicle accident record details. The physiological data may be acquired from the one or more vehicle sensors 116A, 116B, sensors at the personal computing device 140A, 140B, wearable monitoring devices sensors (not shown), or any other suitable devices. These data, for example, may contain measurements of the user's heart rate variability, blood pressure, body temperature, skin conductance, skin perfusion, sweat amount and sweat concentration of particular substances, body movement measurements indicating that a body is at rest or in motion, gait, and a date and time stamp of these measurements.

The ML algorithm of the scoring model may derive a relationship between AVSF effectiveness with the driver's physiological data and driver performance captured by the vehicle telematics data (e.g., lane departure, braking and accelerating patterns, etc.). For example, the scoring model may determine increased effectiveness of some AVSFs for drivers exhibiting certain physiological conditions. Ultimately, the vehicle processor 702, via communication unit 714, according to instructions of the ML scoring model module 706, may alert the driver to activate or deactivate appropriate AVSF(s), or may automatically activate AVSF(s) relevant to a current driving situation.

One or more training data sets may be obtained from historical data at an external database (such as, for example, vehicle accident record database 136 and/or the ML scoring model training database 138), from vehicles 115A, 115B, from personal computing devices 140A, 140B, from drivers' wearable monitoring devices, from remote monitoring devices, or from any other suitable devices. Scoring model training may be performed by a vehicle onboard computing device 700, executed by a processor 702 according to instructions on ML scoring model module 706 on program memory 704. In this scenario, one or more of the scoring model training data sets may be associated with the vehicle of the vehicle onboard computing device 700.

In some embodiments, the AVSF, telematics, and accident record training data sets may include data associated with vehicles other than the vehicles for which the ML model or models are being trained in addition to or instead of data indicative of vehicles for which the ML model or models are being trained.

At the block 808, various measures may be taken to ensure a robust set of training data (e.g., providing standardized, heterogeneous data, removing outliers, imputing missing values, and so on). In certain embodiments, special feature engineering techniques may be used to extract or derive the best representations of the predictor variables to increase the effectiveness of the model. To avoid overfitting, in some embodiments feature reduction may be performed. In certain embodiments, feature engineering techniques may include an analysis to remove uncorrelated features or variables. Variables may be evaluated in isolation to eliminate low predictive value variables, for example, by applying a cut-off value. Depending on the type of model being built and the phase of the modeling process, the cut-off values may be determined in consideration of, for example, correlations between predictor variables and target variables close to 0, correlations between two predictor variables close to 1, p-values greater than 0.05, L1 and L2 regulation, learning rates (in tree based models) as a hyper-parameter to find the best model, and forward, backward, and stepwise variable selection.

Initially, at the block 808, relevant data may be selected from among available historical data. Training data may be assessed and cleaned, including handling missing data and handling outliers. For example, missing records, zero values (e.g., values that were not recorded), incomplete data sets (e.g., for scenarios when data collection was not completed), outliers, and inconclusive data may be removed. In order to select high predictive value features, special feature engineering techniques may be used to derive useful features from the datasets. For example, data may be visualized for the underlying relationships to determine which feature engineering steps should be assessed for performance improvement.

This step may include manually entering user input, for example via user interface 123, which may include defining possible predictive variables for the scoring model. Manual user input may also include manually including or excluding variables selection after running special feature engineering techniques. Manual user input may be guided by an interest to evaluate, for example, an interaction of two or more predictor variables (e.g., lane keeping assistance and road pavement condition).

At the block 812, the ML module receives test data for testing the model or validation data for validating the model (e.g., from one of the described respective data sources). Some or all of the training, test, or validation data sets may be labeled with predetermined AVSF effectiveness score. The developed model may utilize this scale to rank the target features of the model, and in some implementations determine one or more AVSF effectiveness scores.

The scoring model development and evaluation module of the block 804, which may be part of the effectiveness score ML model trainer 130 module, executed by the processor 120 according to instructions on program memory 122, may include any one or more blocks or sub-blocks 814-822, which may be implemented in any suitable order. In a typical example, at block 814, the training module trains the scoring model by running training algorithms on one or more pre-processed training data sets described above.

At block 816, the training module re-runs several iterations of the scoring model. At block 818, the training module evaluates the scoring model, at block 820 the training module determines whether or not the scoring model is ready for deployment before either proceeding to block 822 to output final production model or returning to block 814 to further develop, test, or validate the model.

Regarding the sub-block 814 of the block 804, developing the model typically involves training the model using training data. At a high level, machine-learning models are often utilized to discover relationships between various observable features (e.g., between predictor features and target features) in a training dataset, which can then be applied to an input dataset to predict unknown values for one or more of these features given the known values for the remaining features. At the block 804, these relationships are discovered by feeding the model pre-processed training data including instances each having one or more predictor feature values and one or more target feature values. The model then "learns" an algorithm capable of calculating or predicting the target feature values (e.g., AVSF effectiveness score) given the predictor feature values (e.g., AVSF usage, telematics data, and environmental conditions).

At the sub-block 814, the effectiveness score ML model trainer 130 module may analyze the pre-processed training data sets to generate the scoring model for estimating effectiveness scores of AVSFs. Techniques for generating the machine learning model may include gradient boosting, neural networks, deep learning, linear regression, polynomial regression, logistic regression, support vector machines, decision trees, random forests, nearest neighbors, or any other suitable machine learning technique.

In some examples, the effectiveness score ML model trainer 130 module implements gradient boosting machine learning (for example, using the open source extreme gradient boosting XGBoost library) with a secondary application of the model for close cases and/or error correction. In certain embodiments, training the scoring model may include training more than one model according to the selected methods on the data pre-processed at the block 808 implementing different methods and/or using different subsets of the training data, or according to other criteria.

Training the scoring model may include re-running the model (at optional sub-block 816) to improve the accuracy of prediction values. For example, re-running the model may improve model training when implementing gradient boosting machine learning. In another implementation, re-running the model may be necessary to assess the differences caused by an evaluation procedure. For example, available data sets in the vehicle accident record database 136 and/or the ML scoring model training database 138 may be split into training and testing data sets by randomly assigning sub-sets of data to be used to train the model or evaluate the model to meet the predefined training or testing set size, or an evaluation procedure may use a k-fold cross validation.

Both of these evaluation procedures are stochastic, and as such, each evaluation of a deterministic ML model, even when running the same algorithm, provides a different estimate of error or accuracy. The performance of these different model runs may be compared using one or more accuracy metrics, for example, as a distribution with mean expected error or accuracy and a standard deviation. In some implementations, the models may be evaluated using metrics such as root mean square error (RMSE) to measure the accuracy of prediction values.

Regarding the sub-block 818 of the block 804, evaluating the model typically involves testing the model using testing data or validating the model using validation data. Testing and validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing and validation process is valuable because the model, when implemented, will generate target feature values for future input data that may not be easily checked or validated.

Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding the sub-block 820 of the block 804, the processor 120 may utilize any suitable set of metrics to determine whether or not to proceed to the sub-block 822 to output the final production model. Generally speaking, the decision to proceed to the sub-block 822 or to return to the sub-block 814 will depend on one or more accuracy metrics generated during evaluation (the sub-block 818). After the sub-blocks 814-820 of the block 804 have been completed, the processor 120 may implement the sub-block 822. At the step 822, the processor 120 outputs the scoring model. The model may be stored, for example, at the effectiveness score calculator 131 module, or the ML scoring model module 706.

Exemplary Determining Effectiveness of Advanced Features

Figure 9:
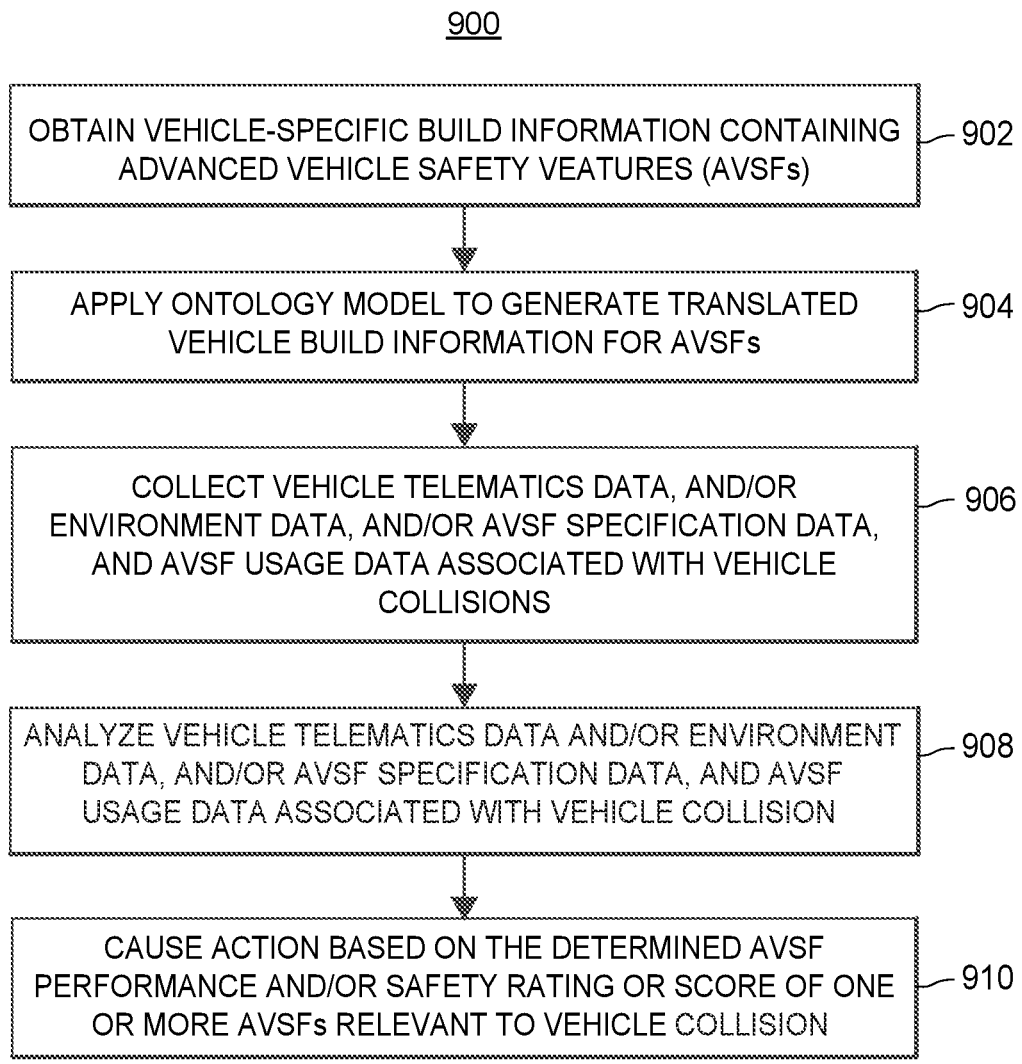
FIG. 9 illustrates a flow diagram of an exemplary computer-implemented method of analyzing performance of advanced vehicle safety features.

FIG. 9 illustrates an exemplary computer-implemented method 900 for determining performance of one or more advanced vehicle safety features at improving vehicle safety. At a block 902, the method 900 includes obtaining, collecting, or receiving via one or more processors and/or associated transceivers (such as via wireless communication or data transmission over one or more radio frequency links)

vehicle-specific build information for a plurality of vehicles from computing devices associated with vehicle manufacturers, information databases, dealerships, repair shops, and/or vehicle owners, or directly from smart vehicles, autonomous vehicles, and/or other vehicles configured for wired or wireless communication with other computing devices.

Furthermore, the block 902 may include analyzing, via one or more processors, the obtained vehicle-specific build information to generate an ontology model mapping each smart safety feature to any OEM-specific terminology associated with the smart safety feature for each OEM. The block 902 may include constructing a vehicle data repository (VDR). The exemplary data sources may be obtained from the National Highway Traffic Safety Administration (NHTSA) VIN decode data, the Highway Loss Data Institute (HLDI) vehicle feature data, and/or the Insurance Institute for Highway Safety (IIHS) crash rating data, or any applicable data sets or data source servers. The block 902 may include generating proxy build sheets by translating and transforming vehicle data to accommodate for different level of detail based upon the different sources. An exemplary method for constructing a VDR is described in more detail below.

The method 900 includes, at a block 904, applying via one or more processors the ontology model to the vehicle-specific build information to generate a translated vehicle build record for advanced vehicle safety features (AVSFs) for each of the plurality of vehicles. The ontology model converts the different terminology associated with each smart safety feature from the OEM-specific terminology into a common vocabulary (i.e., an OEM-agnostic terminology). The block 904 may include obtaining an ontology model mapping each smart safety feature to any OEM-specific terminology associated with the smart safety feature for each OEM, then applying the obtained ontology model to the vehicle-specific build information.

At the block 906 of the exemplary method 900, the one or more processors and/or associated transceivers collect, receive, retrieve, or access vehicle telematics data, environmental data, AVSF specification data, and/or AVSF usage data associated with vehicle accident record information relevant to the plurality of vehicles. Such vehicle accident record information may include details regarding vehicle accidents, such as location, time of day, vehicles involved, vehicle speeds, weather conditions, AVSF usage at and around the time of each vehicle accident, telematics data at and around the time of each accident, types and levels of vehicle damage sustained, repairs required, costs of repairs, or similar data generated at around the time of each vehicle accident or after the vehicle accident.

In some embodiments, such vehicle accident record information may include information regarding a plurality of vehicle accidents involving vehicles of the same make, model, or configuration as vehicles of the plurality of vehicles. In further embodiments, such vehicle accident record information may include information regarding vehicle accidents involving vehicles having AVSFs or combinations of AVSFs operating at the times of the vehicle accidents. In yet further embodiments, the vehicle accident record information may be obtained together with information regarding AVSF operating data not associated with vehicle accidents in order to provide a baseline for relative vehicle accident record information (e.g., vehicle accidents per mile or hour of vehicle operation).

At the block 906, telematics data may be obtained, for example, via wireless communication or data transmission from a vehicle controller/transceiver such as vehicle onboard computing device 114A, 114B, from a driver or passenger mobile device such as a personal computing device 140A, or any other suitable source. The telematics data may include data associated with individual vehicle operation or driving style, such as speed, acceleration, cornering, braking, lane adhesion, location, AVSF usage, usage of optional equipment, etc. The telematics data may also include data associated with vehicle operator physiological data, and/or other data identifying a vehicle operator.

At the block 906, the one or more processors and/or associated transceivers may collect environmental data indicative of one or more environmental conditions associated with vehicle telematics data and AVSF usage data, the environmental data including, among others, weather conditions, terrain parameters, road conditions, etc. The environmental data may be obtained from vehicle sensors, such as the sensors 116A, 116B, from computing device(s) associated with the vehicle user(s), such as the personal computing device 140A, 140B, or from external sources (e.g., public access or proprietary weather and/or navigation sources).

The AVSF specification data, collected at the block 906, may include AVSF configuration data regarding various settings of AVSFs established or set by a vehicle owner. The AVSF specification data may be associated with the vehicle telematics data and the environmental data. The AVSF specification data may include software version data which may include a current version of software installed on the AVSF or AVSF memory unit.

The AVSF specification data may include AVSF usage data including data detailing whether and to what extent the AVSF was used on a given day or trip. For instance, some vehicle owners may decide not to employ or rely upon advanced vehicle safety features, while other vehicle owners may always use or employ the AVSFs available to them or installed on their vehicles. The AVSF specification data may be obtained, for example, from a vehicle controller/transceiver such as a respective vehicle onboard computing device 114A, 114B.

At a block 908, the computer-implemented method 900 includes analyzing, by the one or more processors, one or more of the vehicle telematics data, environment data, AVSF specification data, and AVSF usage data associated with vehicle collisions to determine an effectiveness score or scores of one or more AVSFs relevant to vehicle collision. For example, at the block 908, the computer-implemented method 900 includes providing one or more attributes and/or attribute values of the vehicle telematics data, environment data, AVSF specification data, and/or AVSF usage data associated with vehicle collisions as input to a machine learning (ML) model, such as the ML model of the effectiveness score calculator 131 module or the ML model at the ML scoring model module 706.

The ML model typically has been generated, trained, or created based upon performing one or more statistical analyses on historical telematics data, environmental data, AVSF specification data, and AVSF usage data associated with vehicle collisions to determine one or more AVSF effectiveness scores associated with one or more AVSFs that are correlated to vehicle safety, such as in a manner described elsewhere herein. The ML model may be trained at the effectiveness score ML model trainer 130 module, according to the steps described in reference to FIG. 8. At any rate, the ML model may be applied to the inputs (in some cases, using respective weights of the inputs), and may generate an output indicative of or a performance or safety profile of one or more AVSFs relevant to vehicle collision.

At a block 910, the computer-implemented method 900, causes, by one or more processors, an action to be implemented based upon the determined AVSF performance and/ or safety rating or score of one or more AVSFs relevant to the vehicle collision. The action may include transmitting an alert indicating the generated effectiveness score or scores, where the effectiveness score or scores were generated based upon the one or more attributes and/or attribute values of telematics data, environmental data, AVSF specification data, and AVSF usage data associated with vehicle collisions provided as the input to the ML model, such as the effectiveness score calculator 131 or the ML scoring model module 706. For example, the alert may be displayed or otherwise provided at a user interface of the computing device 102 (such as at the user interface 123), the vehicle onboard computing device 114A, 114B, the personal computing device 140A, 140B, or the OEM Server 106A, 106B, 106C, or a device associated with an insurance provider (not shown).

In some embodiments, the alert may comprise an alert generated and sent to an OEM (e.g., via an OEM dashboard) indicating that a set of one or more AVSFs have been identified as having performance below a requisite level, such as having effectiveness scores below a predetermined threshold level. Information regarding such underperforming AVSFs or the conditions in which such AVSFs fail to attain acceptable performance may be used by the OEM to update and improve the AVSFs. The alert may include an action at a computing device, for example an action at a web interface or a user interface of a computing device. The action may include an action at an OEM dashboard for comparing effectiveness of features in various conditions, the OEM dashboard displayed, for example, at visualization application 134 of the computing device 102 or at an OEM Server 106A, 106B, 106C. The block 910 may include storing the determined effectiveness score or scores of AVSFs at an appropriate storage device, such as the memory 122 or at a database (not shown) and presenting or transmitting the effectiveness score upon retrieval.

As such, via the computer-implemented method 900, the one or more processors may determine the effectiveness score of one or more AVSFs by analyzing historical telematics data, environmental data, AVSF specification data, and/or AVSF usage data associated with vehicle collisions. Such effectiveness score may be correlated with vehicle operating safety, including preventing, avoiding, or decreasing the effect of automotive accidents and/or collisions.

Exemplary Advanced Vehicle Safety Feature Analysis

In one aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, less, or alternate actions, including those discussed elsewhere herein.

For instance, the method may include generating a virtual report detailing the individual AVSF performance rating or safety score for each AVSF in or defined by the ontology. The method may also include publishing the virtual report or otherwise making the virtual report available via a virtual portal.

In some embodiments, the AVSF data may be AVSF configuration, software, and/or usage data. Additionally or alternatively, the AVSF data may include or detail vehicle owner preferences for AVSF configurations and usage. The AVSF data may include software version information of a current software version installed or executing on the AVSF. The AVSF may be an autonomous or semi-autonomous vehicle feature, technology, or system.

The vehicle telematics data may include speed, acceleration, cornering, braking, location, and time of day information. Analyzing, via the one or more processors, the vehicle telematics data and/or AVSF data to determine an individual AVSF performance rating or safety score may include inputting the vehicle telematics data and/or AVSF data into a machine learning program, module, model, or algorithm trained to generate an AVSF performance rating or safety score based upon vehicle telematics data and/or AVSF data.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score.

The one or more processors may be further configured to generate a virtual report detailing the individual AVSF performance rating or safety score for each AVSF in or defined by the ontology. The one or more processors may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

In another aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model.

The method may include generating a virtual report detailing the individual AVSF performance rating or safety score for each AVSF in or defined by the ontology. The method may include inputting the vehicle telematics data associated with the vehicle collision and/or AVSF data associated with the vehicle collision into a machine learning program, module, model, or algorithm trained to generate an AVSF performance rating or safety score based upon vehicle telematics data and/or AVSF data. The vehicle telematics data and/or AVSF data may be generated or collected before, during, and/or after a vehicle collision. The method may include additional, less, or alternate actions, including those discussed elsewhere herein.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

Exemplary Methods for Constructing a Vehicle Data REPOSITORY

Broadly speaking, the vehicle data repository (VDR) computing device, such as the computing device 102, may populate the fields of the standardized build sheet by selecting data from data source servers, such as the National Highway Traffic Safety Administration (NHTSA) VIN decode data, the Highway Loss Data Institute (HLDI) vehicle feature data, and/or the Insurance Institute for Highway Safety (IIHS) crash rating data, or any applicable data source servers. The standardized build sheet for a particular vehicle may be the vehicle-specific build information of a vehicle manufactured by an OEM. OEM build sheets may be constructed according to any suitable technique. Advantageously, in some embodiments, the OEM build sheets may be constructed according to an OEM-agnostic terminology. As described above, the OEM-agnostic terminology allows for common features (e.g., safety features) and vehicle parts to be evaluated, even if their original OEM-specific terminology is different. Moreover, the OEM-agnostic terminology may be leveraged to provide a common terminology for any type of information. For instance, OEM-agnostic terms may be used for vehicle parts.

The OEM build sheets are sent from the VBI database 135 to the VDR computing device. Additional vehicle information may be sent to the VDR computing device. In particular, a NHTSA data source sends a vehicle build sheet; a HLDI data source sends a vehicle build sheet; and an IIHS data source sends a vehicle build sheet. In this way, for example, the NHTSA data source, the HLDI data source, and the IIHS data source correspond to the data source databases. It should be understood that the VDR computing device may receive the OEM build sheets and/or vehicle build sheets in any order.

Further, the VDR computing device brings the data received from all of the data sources to a common ontology. The common ontology creates a mapping between all of the OEM build sheets and, for example, the NHTSA data source, the HLDI data source, the IIHS data source and the standardized build sheet. The common ontology may convert the different terminology from the OEM build sheets, the NHTSA data source, the HLDI data source, the IIHS data source and the standardized build sheet into a common vocabulary.

In some examples, the common ontology is created using a machine learning model, which may be trained using data source-specific and/or standardized build sheet-specific terminology associated with each of a plurality of known data sources and the standardized build sheet. For instance, machine learning or natural language processing may be used to group similar terminology from different data sources and the standardized build sheet, e.g., based upon similarities between descriptions of each term and/or based upon similarities between the terms themselves. The trained machine learning model may be applied to the obtained vehicle build information in order to identify specific terminology associated with vehicle features, vehicle parts, etc.

The machine learning model may be of any suitable kind. For instance, the machine learning model may be any of a gradient boosting machine learning algorithm (e.g., XGBoost), a neural network, a deep learning algorithm, a regression technique, etc.

Furthermore, once the common ontology has been made and applied to the received data, the VDR computing device may bring any or all of the received data to a common level of detail. For instance, if data from a data source has too much detail from a data source (e.g., for entry into the standardized build sheet), the data may be extrapolated up. For example, if the data from a data source for a particular part includes a color of the particular part as light blue, the color may be extrapolated up to blue. Additionally or alternatively, if the data from any of the data sources does not include enough detail, the data may be predicted down to include additional detail.

Further, the VDR computing device constructs the standardized build sheets by selecting between the vehicle data of the data sources to fill the fields of the standardized vehicle build sheet. For instance, the VDR computing device may select between the vehicle data based upon a determination of a best source for the information for each of the fields based upon reliability and detail of each of the respective data sources. The standardized build sheets may be stored for later use, for example at the VBI database 135 or at the computing device 102. It should be understood that the example method for populating the fields of the standardized build sheet by selecting data from data source servers may include additional, fewer, or alternate actions, including those discussed elsewhere herein.

Exemplary Method for Building a Vehicle Data Repository

Broadly speaking, the exemplary computer-implemented method for building a vehicle data repository includes first constructing OEM build sheets, and second selecting between information from an OEM build sheet and information from a second data source, in accordance with some embodiments. One or more steps of the method may be implemented as a set of instructions stored on a computer-readable memory and executable on one or more processors. It should be understood that the exemplary computer-implemented method for building a vehicle data repository may include additional, fewer, or alternate actions, including those discussed elsewhere herein.

Vehicle build information for a plurality of vehicles manufactured by a plurality of OEMs may be obtained, e.g., from databases associated with each OEM, such as databases 108A, 108B, and 108C. For example, the vehicle build information obtained from each OEM may include information from vehicle build sheets for each individual vehicle manufactured by that OEM, with each vehicle build sheet listing all features of the individual vehicle.

The vehicle build information may contain, for instance, OEM-specific terminology associated with one or more features associated with each vehicle. For instance, the features may be smart safety features. In one example of this, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another example, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed by a processor to generate an ontology model mapping each feature (or smart safety feature) to any OEM-specific terminology associated with the feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained using OEM-specific terminology associated with each of a plurality of known features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each feature for each OEM.

The ontology model may be applied to the vehicle build information to generate translated vehicle build information for each of the plurality of vehicles, such that the OEM-specific terminology associated with each feature is replaced with OEM-agnostic terminology for the feature. For instance, wherever OEM-specific terms such as "the OEM-specific terms: "lane change assist," "blind spot info system," and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

Further, the OEM build sheets are constructed using the OEM-agnostic terminology. The OEM build sheets may be constructed using any suitable technique, including those described above. The VDR computing device receives vehicle build sheets from second data sources. In some embodiments, the second data sources may be databases of NHTSA, HLDI, and/or IIHS.

The VDR computing device constructs the standardized build sheets by selecting information from the OEM build sheets and/or the build sheets obtained from the second data sources. In some embodiments, the information is selected from the OEM build sheet and the vehicle build sheet based upon a determination of a best source for the information for each of the fields based upon reliability and detail of each of the respective data sources.

In some implementations, the information is selected using a trained machine learning model. The machine learning model may be of any suitable kind. For instance, the machine learning model may be any of a gradient boosting machine learning algorithm (e.g., XGBoost), a neural network, a deep learning algorithm, a regression technique, etc.

In some variations, as part of the selecting of the information, the VDR computing device may bring any or all of the received data to a common level of detail. For instance, if data from a data source has too much detail from a data source (e.g., for entry into the standardized build sheet), the data may be extrapolated up. For example, if the data from a data source for a particular part includes a color of the particular part as light blue, the color may be extrapolated up to blue. Additionally or alternatively, if the data from any of the data sources does not include enough detail, the data may be predicted down to include additional detail.

However constructed, the standardized build sheets may then be added to the VDR to build the VDR. In some embodiments, the VDR computing device may also determine an insurance rating and/or risk rating for a particular vehicle based upon an effectiveness score associated with each feature associated with a particular vehicle. The insurance rating and/or risk rating may then be displayed to a user via, e.g., via a web interface or via the user interface, such as a user interface of a personal computing device 140A, 140B.

Additional Considerations

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In certain embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for determining effectiveness of vehicle safety features, the method comprising:
   obtaining, by a processor, vehicle-specific build information for each of a plurality of vehicles manufactured by a plurality of original equipment manufacturers (OEMs), the vehicle-specific build information containing OEM-specific terminology associated with one or more smart safety features associated with each vehicle;
   obtaining, by a processor, an ontology model mapping each smart safety feature to an OEM-specific terminology associated with the smart safety feature for each OEM;
   applying, by a processor, the ontology model to the vehicle-specific build information to generate a translated vehicle build record for each of the plurality of vehicles, such that the OEM-specific terminology associated with each smart safety feature is replaced with OEM-agnostic terminology for the smart safety feature;
   obtaining, by a processor from a plurality of on-board computing devices associated with the plurality of vehicles, vehicle telematics data and environmental data generated for each of the plurality of vehicles, wherein the vehicle telematics data comprises usage data indicating an extent of usage of the smart safety features of the respective vehicle and wherein the environmental data indicates characteristics of an environment in which the respective vehicle is operating;
   obtaining, by a processor, vehicle accident record information for a plurality of vehicle accidents involving one or more of the plurality of vehicles, wherein the vehicle accident record information is associated with usage of the smart safety features;
   generating, by a processor, an effectiveness score associated with each smart safety feature in each of a plurality of environments, at least by analyzing a plurality of translated vehicle build records, vehicle telematics data, environmental data, and vehicle accident records associated with each of the plurality of vehicles using a machine learning based regression estimator; and
   causing, by a processor, an action to be implemented based upon the generated effectiveness score, comprising: (i) determining a respective effectiveness score of at least one smart safety feature in a current environment of at least one of the plurality of vehicles is above an activation threshold or below a deactivation threshold and (ii) sending a control signal to a respective on-board computing device of the respective vehicle to automatically activate or deactivate the at least one smart safety feature of the respective vehicle based upon the respective effectiveness score.

2. The computer-implemented method of claim 1, wherein obtaining vehicle-specific build information for each of the plurality of vehicles includes obtaining vehicle-specific build information from a vehicle feature database associating each Vehicle Identification Number (VIN) with installed smart safety features.

3. The computer-implemented method of claim 1, further comprising generating the ontology model mapping by analyzing the obtained vehicle build information, wherein analyzing the obtained vehicle build information to generate an ontology model mapping each smart safety feature to OEM-specific terminology associated with the smart safety feature for each OEM comprises:
   training, by a processor, a machine learning model using OEM-specific terminology associated with each of a plurality of known smart safety features for a plurality of OEMs; and
   applying, by a processor, the trained machine learning model to the obtained vehicle build information in order to identify OEM-specific terminology associated with each smart safety feature for each OEM.

4. The computer-implemented method of claim 1, further comprising generating the vehicle telematics data for each of the plurality of vehicles by analyzing data obtained from one or more sensors disposed at a vehicle, generating a data set based upon the analyzed data, and transmitting the data set wirelessly to a server.

5. The computer-implemented method of claim 1, wherein the vehicle telematics data for each vehicle includes indications of whether the smart safety feature associated with the vehicle was activated or deactivated at a date and time of an accident associated with the vehicle.

6. The computer-implemented method of claim 1, wherein the vehicle accident record information includes one or more of a number of accidents, a frequency of accidents, or a severity of accidents associated with each combination of one or more of the smart safety features.

7. The computer-implemented method of claim 1, wherein the vehicle accident record information includes information regarding one or more of a claim type, a vehicle reparability, or a cost associated with each of the vehicle accidents.

8. The computer-implemented method of claim 1, wherein generating the effectiveness score associated with each smart safety feature comprises predicting the effectiveness score in combination with at least one other selected smart safety feature, and predicting the effectiveness score includes predicting a level of effectiveness or ineffectiveness of each smart safety feature in combination with the selected feature or features.

9. The computer-implemented method of claim 1, wherein causing the action to be implemented comprises:
obtaining vehicle information regarding a subset of the plurality of smart safety features installed in a particular vehicle; and
determining an insurance rating for the particular vehicle based upon the effectiveness scores associated with each smart safety feature of the subset of smart safety features.

10. The computer-implemented method of claim 1, wherein causing the action to be implemented comprises:
identifying a set of one or more of the smart safety features associated with a manufacturer of the OEMs, each of the smart safety features in the set having respective effectiveness scores below a threshold level; and
sending an alert to the manufacturer including information regarding the effectiveness scores of the set of smart safety features.

11. The computer-implemented method of claim 1, wherein the vehicle-specific build information includes manufacturer-installed smart safety features and aftermarket smart safety features.

12. A computer system for determining effectiveness of vehicle safety features, comprising:
one or more processors; and
one or more non-transitory program memories communicatively coupled to the one or more processors and storing executable instructions that, when executed by the one or more processors, cause the computer system to:
obtain vehicle-specific build information for each of a plurality of vehicles manufactured by a plurality of original equipment manufacturers (OEMs), the vehicle-specific build information containing OEM-specific terminology associated with one or more smart safety features associated with each vehicle;
obtain an ontology model mapping each smart safety feature to an OEM-specific terminology associated with the smart safety feature for each OEM;
apply the ontology model to the vehicle-specific build information to generate a translated vehicle build record for each of the plurality of vehicles, such that the OEM-specific terminology associated with each smart safety feature is replaced with OEM-agnostic terminology for the smart safety feature;
obtain vehicle telematics data and environmental data generated for each of the plurality of vehicles from a plurality of on-board computing devices associated with the plurality of vehicles, wherein the vehicle telematics data comprises usage data indicating an extent of usage of the smart safety features of the respective vehicle and wherein the environmental data indicates characteristics of an environment in which the respective vehicle is operating;
obtain vehicle accident record information for a plurality of vehicle accidents involving one or more of the plurality of vehicles, wherein the vehicle accident record information is associated with usage of the smart safety features;
generate an effectiveness score associated with each smart safety feature in each of a plurality of environments, at least by analyzing a plurality of translated vehicle build records, vehicle telematics data, environmental data, and vehicle accident records associated with each of the plurality of vehicles using a machine learning based regression estimator; and
cause an action to be implemented based upon the generated effectiveness score, comprising: (i) determining a respective effectiveness score of at least one smart safety feature in a current environment of at least one of the plurality of vehicles is above an activation threshold or below a deactivation threshold and (ii) sending a control signal to a respective on-board computing device of the respective vehicle to automatically activate or deactivate the at least one smart safety feature of the respective vehicle based upon the respective effectiveness score.

13. The system of claim 12, wherein the executable instructions that cause the computer system to obtain vehicle-specific build information for each of the plurality of vehicles cause the computer system to obtain vehicle-specific build information from a vehicle feature database associating each Vehicle Identification Number (VIN) with installed smart safety features.

14. The system of claim 12, wherein the executable instructions further cause the computer system to generate the vehicle telematics data for each of the plurality of vehicles by analyzing data obtained from one or more sensors disposed at a vehicle, generating a data set based upon the analyzed data, and transmitting the data set wirelessly to a server.

15. The system of claim 12, wherein the vehicle accident record information includes one or more of a number of accidents, a frequency of accidents, or a severity of accidents associated with each combination of one or more of the smart safety features.

16. The system of claim 12, wherein the executable instructions further cause the computer system to generate the effectiveness score associated with each smart safety feature cause the computer system to predict the effectiveness score in combination with at least one other selected smart safety feature, including predicting a level of effectiveness or ineffectiveness of each smart safety feature in combination with the selected feature or features.

17. A tangible, non-transitory computer-readable storage medium storing computer-executable instructions for determining effectiveness of vehicle safety features that, when executed by at least one processor of a computer system, cause the computer system to:
obtain vehicle-specific build information for each of a plurality of vehicles manufactured by a plurality of original equipment manufacturers (OEMs), the vehicle-specific build information containing OEM-specific terminology associated with one or more smart safety features associated with each vehicle;
obtain an ontology model mapping each smart safety feature to an OEM-specific terminology associated with the smart safety feature for each OEM;
apply the ontology model to the vehicle-specific build information to generate a translated vehicle build record for each of the plurality of vehicles, such that the OEM-specific terminology associated with each smart safety feature is replaced with OEM-agnostic terminology for the smart safety feature;
obtain vehicle telematics data and environmental data generated for each of the plurality of vehicles from a plurality of on-board computing devices associated with the plurality of vehicles, wherein the vehicle telematics data comprises usage data indicating an extent of usage of the smart safety features of the respective vehicle and wherein the environmental data indicates characteristics of an environment in which the respective vehicle is operating:

obtain vehicle accident record information for a plurality of vehicle accidents involving one or more of the plurality of vehicles, wherein the vehicle accident record information is associated with usage of the smart safety features:

generate an effectiveness score associated with each smart safety feature in each of a plurality of environments, at least by analyzing a plurality of translated vehicle build records, vehicle telematics data, environmental data, and vehicle accident records associated with each of the plurality of vehicles using a machine learning based regression estimator; and cause an action to be implemented based upon the generated effectiveness score, comprising: (i) determining a respective effectiveness score of at least one smart safety feature in a current environment of at least one of the plurality of vehicles is above an activation threshold or below a deactivation threshold and (ii) sending a control signal to a respective on-board computing device of the respective vehicle to automatically activate or deactivate the at least one smart safety feature of the respective vehicle based upon the respective effectiveness score.

18. The tangible, non-transitory computer-readable storage medium of claim 17, wherein the computer-executable instructions that cause the computer system to generate the effectiveness score associated with each smart safety feature cause the computer system to predict the effectiveness score in combination with at least one other selected smart safety feature, including predicting a level of effectiveness or ineffectiveness of the each smart safety feature in combination with the selected feature or features.

19. The tangible, non-transitory computer-readable storage medium of claim 17, wherein the vehicle accident record information includes information regarding one or more of a claim type, a vehicle reparability, or a cost associated with each of the vehicle accidents.

20. The tangible, non-transitory computer-readable storage medium of claim 17, wherein the computer-executable instructions that cause the action to be implemented cause the computer system to:

identify a set of one or more of the smart safety features associated with a manufacturer of the OEMs, each of the smart safety features in the set having respective effectiveness scores below a threshold level; and send an alert to the manufacturer including information regarding the effectiveness scores of the set of smart safety features.

* * * * *